United States Patent
Honda et al.

(10) Patent No.: US 9,643,396 B2
(45) Date of Patent: *May 9, 2017

(54) PEELING DEVICE, PEELING SYSTEM AND PEELING METHOD

(71) Applicant: TOKYO ELECTRON LIMITED, Tokyo (JP)

(72) Inventors: Masaru Honda, Koshi (JP); Ryoichi Sakamoto, Koshi (JP); Katsuhiro Ikeda, Koshi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,778

(22) Filed: May 28, 2015

(65) Prior Publication Data

US 2015/0343755 A1 Dec. 3, 2015

(30) Foreign Application Priority Data

Jun. 3, 2014 (JP) .................................. 2014-114872

(51) Int. Cl.
*B32B 43/00* (2006.01)

(52) U.S. Cl.
CPC ........ *B32B 43/006* (2013.01); *B32B 2309/16* (2013.01); *B32B 2457/14* (2013.01); *Y10T 156/1132* (2015.01); *Y10T 156/1168* (2015.01); *Y10T 156/19* (2015.01); *Y10T 156/1944* (2015.01); *Y10T 156/1967* (2015.01); *Y10T 156/1978* (2015.01); *Y10T 156/1989* (2015.01)

(58) Field of Classification Search
CPC ............ B32B 43/006; Y10T 156/1168; Y10T 156/1978; Y10T 156/1132; Y10T 156/1944; Y10T 156/1989
See application file for complete search history.

(56) References Cited

U.S. PATENT DOCUMENTS

| | | | |
|---|---|---|---|
| 5,133,824 A | 7/1992 | Huberts et al. | |
| 6,503,130 B2 | 1/2003 | Lim | |
| 6,881,135 B2 | 4/2005 | Boo et al. | |
| 7,187,162 B2 * | 3/2007 | Kerdiles | G01N 19/04 |
| | | | 156/765 |
| 7,571,538 B2 | 8/2009 | Teshirogi et al. | |
| 7,757,740 B2 | 7/2010 | Nakamura | |

(Continued)

FOREIGN PATENT DOCUMENTS

| | | |
|---|---|---|
| JP | 2013-149655 A | 8/2013 |
| JP | 2014-060347 A | 4/2014 |
| JP | 2014-060348 A | 4/2014 |

*Primary Examiner* — Mark A Osele
(74) *Attorney, Agent, or Firm* — Nath, Goldberg & Meyer; Jerald L. Meyer

(57) ABSTRACT

A peeling device which peels a superposed substrate obtained by bonding a first substrate and a second substrate together, from one end portion of the superposed substrate toward the other end portion thereof, includes a first holding unit configured to hold the first substrate of the superposed substrate, a second holding unit configured to hold the second substrate of the superposed substrate, and a moving unit configured to move the first holding unit away from the second holding unit. The moving unit is configured to move in at least a peeling direction of the superposed substrate.

14 Claims, 27 Drawing Sheets

(56) References Cited

U.S. PATENT DOCUMENTS

| | | | |
|---|---|---|---|
| 8,360,129 B2* | 1/2013 | Ebata | B65H 41/00 156/714 |
| 8,465,011 B2 | 6/2013 | Segawa et al. | |
| 8,470,129 B1* | 6/2013 | Wang | B32B 38/10 156/705 |
| 8,858,859 B2* | 10/2014 | Song | B82Y 10/00 156/707 |
| 9,162,435 B2* | 10/2015 | Honda | B32B 38/10 |
| 2004/0118515 A1 | 6/2004 | Huang et al. | |
| 2009/0139662 A1 | 6/2009 | Nakamura et al. | |
| 2009/0279995 A1 | 11/2009 | Haji et al. | |
| 2010/0000680 A1 | 1/2010 | Inao et al. | |
| 2011/0297329 A1 | 12/2011 | Canale et al. | |
| 2012/0080150 A1 | 4/2012 | Riege et al. | |
| 2012/0168091 A1 | 7/2012 | Kell et al. | |
| 2013/0048224 A1 | 2/2013 | George et al. | |
| 2013/0146228 A1 | 6/2013 | Hirakawa et al. | |
| 2013/0292062 A1* | 11/2013 | Iwashita | H01L 21/67092 156/750 |
| 2014/0076497 A1* | 3/2014 | Honda | H01L 21/67092 156/701 |
| 2015/0217557 A1* | 8/2015 | Lee | B32B 43/006 156/707 |
| 2016/0176181 A1* | 6/2016 | Kim | B32B 43/006 156/701 |

\* cited by examiner

PEELING DEVICE, PEELING SYSTEM AND PEELING METHOD

CROSS-REFERENCE TO RELATED APPLICATION

This application claims the benefit of Japanese Patent Application No. 2014-114872, filed on Jun. 3, 2014, in the Japan Patent Office, the disclosure of which is incorporated herein in its entirety by reference.

TECHNICAL FIELD

The present disclosure relates to a peeling device which separates a superposed substrate obtained by bonding a first substrate and a second substrate together, from one end portion of the superposed substrate toward the other end portion thereof, a peeling system provided with the peeling device, and a peeling method which makes use of the peeling device.

BACKGROUND

Recently, in a manufacturing process of semiconductor devices, for example, an increase in diameter and decrease in thickness of semiconductor substrates, such as silicon wafers, compound semiconductor wafers or the like, are in progress. A plurality of electronic circuits is formed on a semiconductor substrate, which will be hereinafter referred to as a target substrate. When transferring or polishing a large and thin target substrate, it is likely that the target substrate is bent or broken. For this reason, a target substrate is reinforced by bonding a support substrate thereto, the reinforced target substrate is transferred or polished, and then the support substrate is peeled off from the target substrate.

For example, there is known a peeling method. In this method, a support substrate is sucked and held by a first holding unit. A target substrate is sucked and held by a second holding unit. Under this state, the support substrate is peeled off from the target substrate from one end portion of the support substrate toward the other end portion thereof by moving the outer periphery portion of the first holding unit away from the second holding unit, namely by moving the outer periphery portion of the first holding unit vertically upward, through the use of a moving unit.

In the aforementioned method, for example, as shown in FIG. 26, a moving unit 700 includes a support member 701 and a moving mechanism 702. The moving mechanism 702 is fixed to a base portion 710. Furthermore, a first holding unit 720 for holding a support substrate S includes an elastic member 721 and a plurality of sucking parts 722. The support member 701 is connected to the outer periphery portion of the elastic member 721.

When peeling off the support substrate S from the target substrate W, if the first holding unit 720 is pulled upward by the moving unit 700, the elastic member 721 of the first holding unit 720 is flexibly deformed along with the pulling operation due to elasticity of the elastic member 721. At this time, the moving mechanism 702 is kept fixed to the base portion 710. Therefore, as shown in FIG. 27, the position of one end portion S1 of the support substrate S in the horizontal direction (the X-axis direction in FIG. 27) remains unchanged. As a result, the support substrate S is stretched just as much as the vertical upward displacement of one end portion S1 of the support substrate S. Thus, a force F acting toward one end portion S1 (acting in the X-axis negative direction in FIG. 27) is generated in the peeling-off portion where the support substrate S is peeled off from the target substrate W. It is likely that the target substrate W or the support substrate S is damaged by the force F. Specifically, according to the studies conducted by the present inventors, it was found that, if the diameter of the support substrate S (or the target substrate W) is, e.g., 300 mm, and if the height H of one end portion S1 of the support substrate S moved vertically upward is 20 mm, the target substrate W or the support substrate S is likely to be damaged.

This problem may be generated in a manufacturing process of an SOI (Silicon On Insulator) or the like which involves peeling-off of substrates.

SUMMARY

The present disclosure provides a peeling device capable of properly performing a peeling process of a target substrate and a support substrate, a peeling system, and a peeling method.

According to some embodiments of the present invention, provided is a peeling device which peels a superposed substrate obtained by bonding a first substrate and a second substrate together, from one end portion of the superposed substrate toward the other end portion thereof, including: a first holding unit configured to hold the first substrate of the superposed substrate; a second holding unit configured to hold the second substrate of the superposed substrate; and a moving unit configured to move the first holding unit away from the second holding unit, wherein the moving unit is configured to move in at least a peeling direction of the superposed substrate.

According to some embodiments of the present invention, provided is a peeling method of peeling a superposed substrate obtained by bonding a first substrate and a second substrate together, from one end portion of the superposed substrate toward the other end portion thereof, including: a first holding process in which the first substrate of the superposed substrate is held by a first holding unit; a second holding process in which the second substrate of the superposed substrate is held by a second holding unit; and a moving process in which the first holding unit is moved away from the second holding unit by a moving unit connected to the first holding unit, wherein, in the moving process, the moving unit is moved in at least a peeling direction of the superposed substrate.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

1. PEELING SYSTEM

Figure 1:
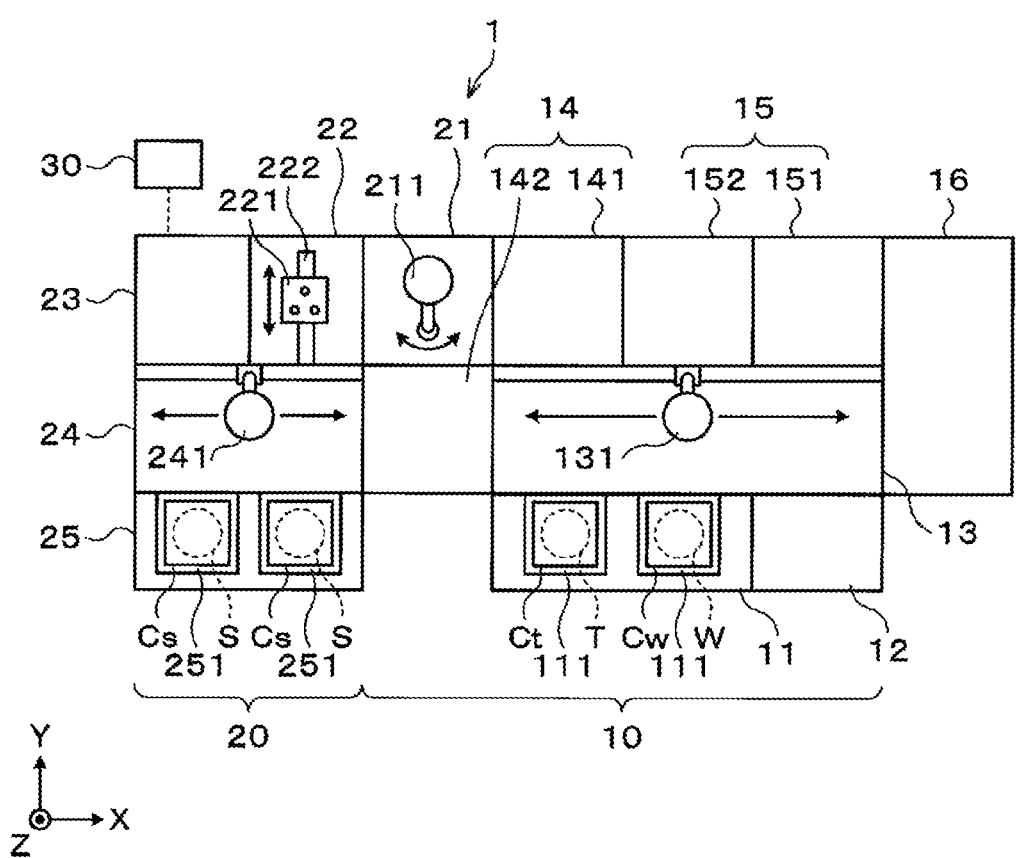
FIG. 1 is a schematic plan view illustrating a configuration of a peeling system according to an embodiment of the present disclosure.
Figure 2:
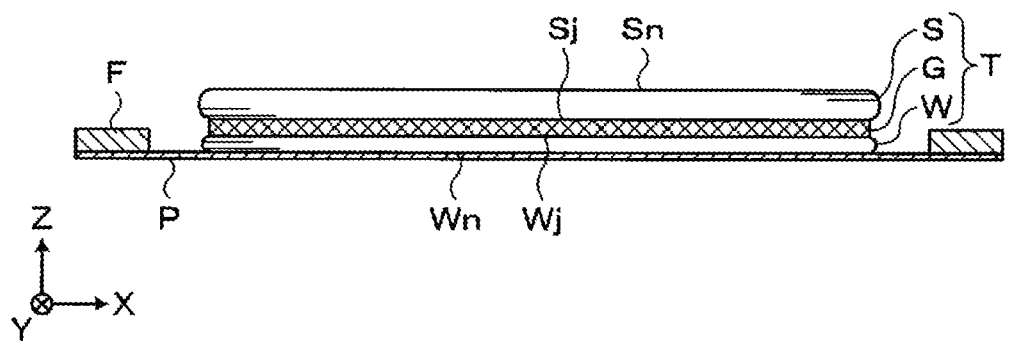
FIG. 2 is a schematic side view of a superposed substrate held by a dicing frame.
Figure 3:
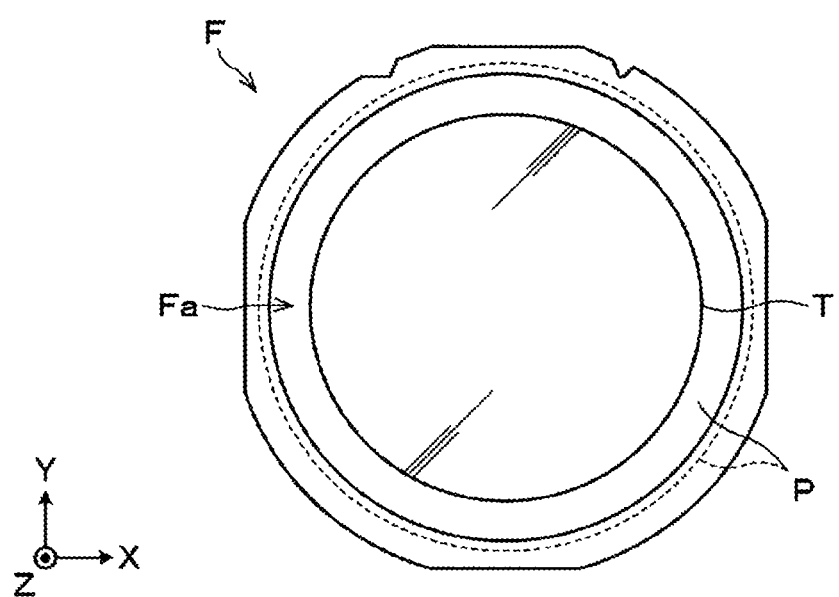
FIG. 3 is a schematic plan view of the superposed substrate held by the dicing frame.

First, a configuration of a peeling system according to the present embodiment will be explained with reference to FIGS. 1 to 3. FIG. 1 is a schematic plan view illustrating a configuration of a peeling system according to the present embodiment. FIG. 2 is a schematic side view of a superposed substrate held by a dicing frame. FIG. 3 is a schematic plan view of the superposed substrate.

In the present disclosure, in order to clarify a positional relationship, the X-axis, the Y-axis, and the Z-axis are defined to be orthogonal to one another, and the positive direction of the Z-axis is defined as a vertically-upward direction.

A peeling system 1 according to the present embodiment illustrated in FIG. 1 separates a superposed substrate T (see FIG. 2), in which a target substrate W as a second substrate and a support substrate S as a first substrate are bonded with an bonding agent G, into the target substrate W and the support substrate S.

Hereinafter, as illustrated in FIG. 2, one of the two plate surfaces of the target substrate W bonded to the support substrate S with the bonding agent G interposed therebetween will be referred to as a "bonding surface Wj", and the other plate surface of the target substrate W opposite to the bonding surface Wj will be referred to as a "non-bonding surface Wn." Moreover, one of the two plate surfaces of the support substrate S bonded to the target substrate W with the bonding agent G interposed therebetween will be referred to as a "bonding surface Sj", and the other plate surface of the support substrate S opposite to the bonding surface Sj will be referred to as a "non-bonding surface Sn."

The target substrate W is a substrate where a plurality of electronic circuits is formed on a semiconductor substrate, for example, a silicon wafer, a compound semiconductor wafer and so forth. The plate surface where the electronic circuits are formed is the bonding surface Wj. The target substrate W is made thin by, for example, polishing the non-bonding surface Wn. Specifically, the thickness of the target substrate W ranges from about 20 to about 50 μm.

On the other hand, the support substrate S has a diameter substantially equal to the diameter of the target substrate W and supports the target substrate W. The thickness of the support substrate S ranges from about 650 to about 750 μm. As well as a silicon wafer, a glass substrate may be used as the support substrate S. The thickness of the bonding agent G that bonds the target substrate W and the support substrate S together ranges from about 40 to about 150 μm.

As illustrated in FIG. 3, the superposed substrate T is fixed to a dicing frame F. The dicing frame F is a substantially circular member having an opening portion Fa at the center thereof, wherein the diameter of the opening portion Fa is larger than that of the superposed substrate T. The dicing frame F is made of metal such as stainless steel or the like. The thickness of the dicing frame F is approximately 1 mm, for example.

The superposed substrate T is fixed to the dicing frame F with a dicing tape P interposed therebetween. Specifically, under a state where the superposed substrate T is arranged in the opening portion Fa of the dicing frame F, the dicing tape P is attached to the non-bonding surface Wn of the target substrate W and the rear surface of the dicing frame F so as to close the opening portion Fa from the rear surface of the dicing frame F. Therefore, the superposed substrate T is fixed to (or held by) the dicing frame F.

As illustrated in FIG. 1, the peeling system 1 includes two processing blocks, i.e., a first processing block 10 and a second processing block 20. The second processing block 20 and the first processing block 10 are arranged adjacent to each other along the X-axis direction in this order.

In the first processing block 10, loading of the superposed substrate T, peeling off of the superposed substrate T, cleaning and unloading of the target substrate W after the peeling process, and so forth are performed. That is to say, the first processing block 10 performs processes with respect to the substrates (the superposed substrate T and the target substrate W) held by the dicing frame F. The first processing block 10 includes a loading/unloading station 11, a stand-by station 12, a first transfer region 13, a peeling-off station 14, a first cleaning station 15, and an edge-cut station 16.

The loading/unloading station 11, the stand-by station 12, the peeling-off station 14, the first cleaning station 15, and the edge-cut station 16 are arranged to adjoin the first transfer region 13. Specifically, the loading/unloading station 11 and the stand-by station 12 are arranged side-by-side at the negative Y-axis direction side of the first transfer region 13. One peeling device 141 of the peeling-off station 14 and two first cleaning devices 151 and 152 of the first cleaning station 15 are arranged side-by-side at the positive Y-axis direction side of the first transfer region 13. Another peeling device 142 of the peeling-off station 14 is arranged at the negative X-axis direction side of the first transfer region 13, and the edge-cut station 16 is arranged at the positive X-axis direction side of the first transfer region 13.

In the loading/unloading station 11, a plurality of cassette mounting tables 111 is installed. On each of the cassette mounting tables 111, a cassette Ct accommodating the superposed substrate T or a cassette Cw accommodating the target substrate W after the peeling process is mounted. In the loading/unloading station 11, the cassette Ct and the cassette Cw are loaded or unloaded between the loading/unloading station 11 and the outside of the peeling system 1.

In the stand-by station 12, for example, an ID reader for reading an ID (identification) of the dicing frame F is arranged, whereby the superposed substrate T under process is identified by the ID reader. In addition to the ID reading process, a stand-by process of temporarily putting the superposed substrate T waiting for a next process in a temporary stand-by state is performed in the stand-by station 12 as necessary. In the stand-by station 12, a mounting table where the superposed substrate T transferred by a below-described first transfer device 131 is mounted is installed. The ID reader and the temporary stand-by unit are mounted in the mounting table.

In the first transfer region 13, the first transfer device 131 for transferring the superposed substrate T or the target substrate W subjected to the peeling process is arranged. The first transfer device 131 includes a transfer arm and a substrate holding unit installed in a leading end of the transfer arm. The transfer arm can move in horizontal and vertical directions, and can rotate about a vertical axis. In the first transfer region 13, the first transfer device 131 transfers the superposed substrate T to the stand-by station 12, the peeling-off station 14 or the edge-cut station 16, and transfers the target substrate W after the peeling process to the first cleaning station 15 or the loading/unloading station 11.

In the peeling-off station 14, two of the peeling devices 141 and 142 are arranged. The peeling devices 141 and 142 in the peeling-off station 14 perform a peeling process in which the superposed substrate T is separated into the target substrate W and the support substrate S. Specifically, the peeling devices 141 and 142 arrange the target substrate W and the support substrate S downward and upward, respectively, and separates the superposed substrate T into the target substrate W and the support substrate S. The number of the peeling devices arranged in the peeling-off station 14 is not limited to the present embodiment, but may be set arbitrarily. Further, although the peeling devices 141 and 142 are arranged side-by-side along the horizontal direction in the present embodiment, the peeling devices 141 and 142 may be stacked in the vertical direction.

In the first cleaning station 15, two of the first cleaning devices 151 and 152 are arranged. The first cleaning devices 151 and 152 in the first cleaning station 15 perform a cleaning process for cleaning the target substrate W after the peeling process held by the dicing frame F. As the first cleaning devices 151 and 152, it may be possible to use, e.g., the cleaning device disclosed in Japanese Patent Application Publication No. 2013-016579. The number of cleaning devices arranged in the first cleaning station 15 is not limited to the present embodiment, but can be set arbitrarily. Further, although the first cleaning devices 151 and 152 are arranged side-by-side along the horizontal direction in the present embodiment, the cleaning devices 151 and 152 can be stacked in the vertical direction.

In the edge-cut station 16, an edge-cut device is arranged. The edge-cut device performs an edge-cut process in which a peripheral portion of the bonding agent G in the superposed substrate T is dissolved and removed using a solvent. By removing the peripheral portion of the bonding agent G through the edge-cut process, the target substrate W and the support substrate S can be easily separated in a peeling process described later. The edge-cut device dissolves the peripheral portion of the bonding agent G using the solvent for the bonding agent G, for example, by immersing the superposed substrate T in the solvent.

In the second processing block 20, the support substrate S after the peeling process is cleaned and unloaded. That is to say, the second processing block 20 performs a process with respect to a substrate (the support substrate S) which is not held by the dicing frame F. The second processing block 20 includes a first transfer station 21, a second transfer station 22, a second cleaning station 23, a second transfer region 24, and an unloading station 25.

The first transfer station 21 is arranged at the negative X-axis direction side of the peeling device 141 of the peeling-off station 14 and at the positive Y-axis direction side of the peeling device 142. Moreover, the second transfer station 22, the second cleaning station 23, and the unloading station 25 are arranged so as to adjoin the second transfer region 24. Specifically, the second transfer station 22 and the second cleaning station 23 are arranged side-by-side at the positive Y-axis direction side of the second transfer region 24, and the unloading station 25 is arranged at the negative Y-axis direction side of the second transfer region 24.

The first transfer station 21 receives the support substrate S after the peeling process from the peeling devices 141 and 142 of the peeling-off station 14 and transfers the received support substrate S to the second transfer station 22. In the first transfer station 21, a transfer device 211 is arranged. The transfer device 211 includes a non-contact holding unit, for example, a Bernoulli chuck or the like, which is configured to be rotatable about the horizontal axis. Specifically, as the transfer device 211, it may be possible to use, e.g., the transfer device disclosed in Japanese Patent Application Publication No. 2013-016579. The transfer device 211 transfers the support substrate S from the peeling devices 141 and 142 to the second processing block 20 in a non-contact manner, while reversing the front and rear surfaces of the support substrate S after the peeling process.

In the second transfer station 22, a mounting unit 221 for mounting the support substrate S and a moving unit 222 for moving the mounting unit 221 in the Y-axis direction are arranged. The mounting unit 221 includes, for example, three support pins, and supports and mounts the non-bonding surface Sn of the support substrate S. The moving unit 222 includes a rail extending in the Y-axis direction and a driving unit for moving the mounting unit 221 in the Y-axis direction. In the second transfer station 22, the support substrate S is mounted on the mounting unit 221 by the transfer device 211 of the first transfer station 21, and then the mounting unit 221 is moved toward the second transfer region 24 by the moving unit 222. Then, the support substrate S is transferred from the mounting unit 221 to a second transfer device 241 (to be described later) of the second transfer region 24. In the present embodiment, the mounting unit 221 moves only in the Y-axis direction, but may be configured to move in the X-axis and Y-axis directions.

Since the aforementioned transfer device 211 of the first transfer station 21 holds the support substrate S with the non-contact holding unit such as the Bernoulli chuck or the like, it does not show high transfer reliability. For this reason, if the support substrate S is directly transferred to the second transfer device 241 (to be described later) of second transfer region 24 by the transfer device 211, it is likely that the support substrate S is dropped during the transfer. Therefore, in the present embodiment, the second transfer station 22 is installed between the first transfer station 21 and the second transfer region 24 such that the support substrate S is first mounted in the second transfer station 22.

A second cleaning device is arranged in the second cleaning station 23. The second cleaning device is used to clean the support substrate S after the peeling process. The cleaning device disclosed in Japanese Patent Application Publication No. 2013-016579 may be used as the second cleaning device.

In the second transfer region 24, the second transfer device 241 for transferring the support substrate S after the peeling process is arranged. The second transfer device 241 includes a transfer arm and a substrate holding unit installed in a leading end of the transfer arm. The transfer arm can move in the horizontal and vertical directions, and can rotate about a vertical axis. In the second transfer region 24, the second transfer device 241 transfers the support substrate S after the peeling process to the unloading station 25.

In the unloading station 25, a plurality of cassette mounting tables 251 is installed. On each of the mounting tables 251, a cassette Cs accommodating the support substrate S after the peeling process is mounted. The cassette Cs is unloaded from the unloading station 25 to the outside of the peeling system 1.

The peeling system 1 further includes a control device 30 that controls the operation of the peeling system 1. The control device 30 is, e.g., a computer, and includes a control unit and a storage unit (not illustrated). In the storage unit, programs for controlling a variety of processes, such as the peeling process and the like, are stored. The control unit reads and executes the programs stored in the storage unit, thereby controlling the operation of the peeling system 1.

The programs may be stored in a non-transitory computer-readable storage medium and installed in the storage unit of the control device 30 from the non-transitory computer-readable storage medium. The non-transitory computer-readable storage medium may be, for example, a hard-disk (HD), a flexible disk (FD), a compact disk (CD), a magneto-optical (MO) disk or a memory card.

Figure 4:
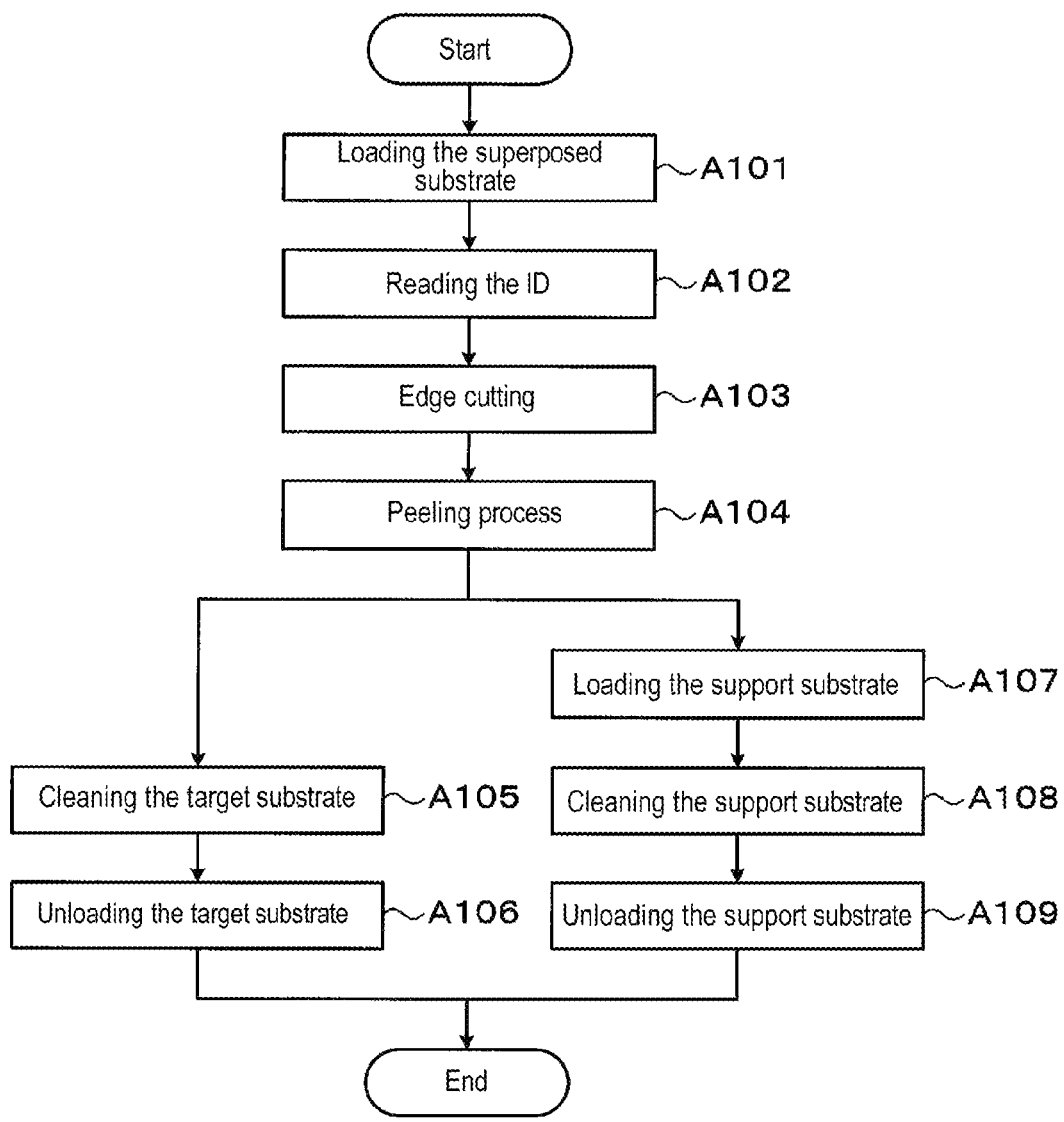
FIG. 4 is a flowchart illustrating a sequence of a peeling process implemented by the peeling system.

Next, a peeling process in which the target substrate W and the support substrate S are separated by the peeling system 1 configured as above will be explained. FIG. 4 is a flowchart illustrating an example of main steps of the peeling process. The peeling system 1 performs each of the process sequences illustrated in FIG. 4 under the control of the control device 30.

First, the cassette Ct accommodating a plurality of the superposed substrates T and an empty cassette Cw are mounted on the predetermined cassette mounting tables 111 of the loading/unloading station 11, and empty cassettes Cs are mounted on the predetermined cassette mounting tables 251 of the unloading station 25. In the peeling system 1, the first transfer device 131 of the first processing block 10 takes out the superposed substrate T from the cassette Ct mounted in the loading/unloading station 11. At this time, under a state where the target substrate W is positioned downward and the support substrate S is positioned upward, the superposed substrate T is held from above by the substrate holding unit of the first transfer device 131. Then, the first transfer device 131 performs a substrate loading process for loading the superposed substrate T taken out from the cassette Ct into the stand-by station 12 (Step A101 in FIG. 4).

Next, in the stand-by station 12, the ID reader performs an ID reading process for reading an ID of the dicing frame F (Step A102 in FIG. 4). The ID read by the ID reader is transmitted to the control device 30. Thereafter, the superposed substrate T is taken out from the stand-by station 12 and is transferred to the edge-cut station 16 by the first transfer device 131.

In the edge-cut station 16, the edge-cut device performs an edge-cut process with respect to the superposed substrate T (Step A103 in FIG. 4). The peripheral portion of the bonding agent G is removed by the edge-cut process, which makes it easier to perform peeling-off of the target substrate W and the support substrate S in a subsequent peeling process. It is therefore possible to shorten the peeling process time.

In the peeling system 1 according to the present embodiment, since the edge-cut station 16 is incorporated in the first processing block 10 as described above, the superposed substrate T loaded into the first processing block 10 can be directly loaded into the edge-cut station 16 by using the first transfer device 131. Therefore, the throughput of a series of the peeling processes can be improved. Moreover, the time taken from the edge-cut process to the peeling process can be easily managed, whereby performance of the peeling-off can be stabilized.

Moreover, if the superposed substrate T is required to wait for a next process due to a difference in process times among devices, the superposed substrate T can be temporarily put in a stand-by state using the temporary stand-by unit installed in the stand-by station 12, whereby a time loss between a series of processes can be reduced.

Next, the superposed substrate T which has been subjected to the edge-cut process is taken out from the edge-cut station 16 and is loaded into the peeling device 141 of the peeling-off station 14 by the first transfer device 131. In the peeling-off station 14, the peeling device 141 performs the peeling process with respect to the superposed substrate T (Step A104 in FIG. 4). The superposed substrate T is separated into the target substrate W and the support substrate S by the peeling process.

Thereafter, in the peeling system 1, a process with respect to the target substrate W after the peeling process and a process with respect to the support substrate S after the peeling process are performed in the first processing block 10 and the second processing block 20, respectively. After the peeling process, the target substrate W is held by the dicing frame F.

In the first processing block 10 after the peeling process, the target substrate W is taken out from the peeling device 141 of the peeling-off station 14 and is loaded into the first cleaning device 151 of the first cleaning station 15 by the first transfer device 131. In the first cleaning station 15, the first cleaning device 151 performs a cleaning process with respect to the target substrate W after the peeling process (Step A105 in FIG. 4). The bonding agent G remaining on the bonding surface Wj of the target substrate W is removed by the cleaning process.

The target substrate W subjected to the cleaning process is taken out from the first cleaning device 151 of the first cleaning station 15 by the first transfer device 131 and is accommodated in the cassette Cw mounted in the loading/unloading station 11. Thereafter, the cassette Cw accommodating a plurality of target substrates W is unloaded out of the loading/unloading station 11 and is then recovered (Step A106 in FIG. 4). In this way, the process with respect to the target substrate W is completed.

Meanwhile, in the second processing block 20, processes (Steps A107 to A109 to be described below) for the support substrate S after the peeling process are performed in parallel with the processes of Steps A105 and A106.

In the second processing block 20, first, the transfer device 211 of the first transfer station 21 performs a transfer process of the support substrate S after the peeling process. Specifically, the transfer device 211 takes out the support substrate S after the peeling process from the peeling device 141 of the peeling-off station 14 and loads the same into the second transfer station 22 (Step A107 in FIG. 4).

After the peeling process, the upper surface side of the support substrate S, i.e., the side of the non-bonding surface Sn, is held by the peeling device 141. The transfer device 211 holds the support substrate S via the bonding surface Sj of the support substrate S from below in a non-contact manner. Subsequently, the transfer device 211 reverses the supported support substrate S, and then mounts the support substrate S on the mounting unit 221 of the second transfer station 22. Thus, the support substrate S is mounted on the mounting unit 221 with the bonding surface Sj thereof facing upward.

In the second transfer station 22, the moving unit 222 moves the mounting unit 221 on which the support substrate S is mounted to a predetermined position at the side of the second transfer region 24. The predetermined position is a position where the transfer arm of the second transfer device 241 can receive the support substrate S mounted on the mounting unit 221.

Next, the support substrate S is taken out from the second transfer station 22 and is loaded into the second cleaning station 23 by the second transfer device 241. In the second cleaning station 23, the second cleaning device performs a cleaning process with respect to the support substrate S after the peeling process (Step A108 in FIG. 4). The bonding agent G remaining on the bonding surface Sj of the support substrate S is removed by this cleaning process.

The support substrate S subjected to the cleaning process is taken out from the second cleaning station 23 by the second transfer device 241 and is accommodated in the cassette Cs mounted in the unloading station 25. Thereafter, the cassette Cs accommodating a plurality of the support substrates S is unloaded from the unloading station 25 and is then recovered (Step A109 in FIG. 4). In this way, the process with respect to the support substrate S is completed.

As described above, the peeling system 1 according to the present embodiment includes the first processing block 10 that processes the superposed substrate T and the target substrate W and the second processing block 20 that processes the support substrate S. Therefore, since the processes with respect to the superposed substrate T and the target substrate W and the processes with respect to the support substrate S can be performed in parallel, a series of substrate processing can be performed efficiently. More specifically, the peeling system 1 according to the present embodiment includes a front-end (the loading/unloading station 11 and the first transfer region 13) for a substrate held by the dicing frame F (the superposed substrate T and the target substrate W after the peeling process) and a front end (the unloading station 25 and the second transfer region 24) for a substrate not held by the dicing frame F (the support substrate S after the peeling process). In this way, the transfer of the target substrate W to the loading/unloading station 11 and the transfer of the support substrate S to the unloading station 25 can be performed in parallel. Therefore, a stand-by time for substrate transfer can be reduced, which improves the throughput of the peeling process.

Moreover, according to the present embodiment, although the superposed substrate T and the target substrate W are held by the dicing frame F, the transfer of the superposed substrate T and the target substrate W which are held by the dicing frame F and the transfer of the support substrate S which is not held by the dicing frame are performed by separate devices of the first transfer device 131 and the second transfer device 241, respectively. Therefore, in the present embodiment, the control for transferring the superposed substrate T, the target substrate W and the support substrate S can be simplified in comparison with a conventional method in which a single transfer device transfers both the substrates held by a dicing frame and the substrates not held by the dicing frame. It is therefore possible to efficiently implement the peeling process.

In the peeling system 1 according to the present embodiment, the peeling-off station 14, the second cleaning station 23 and the second transfer region 24 are connected through the first transfer station 21 and the second transfer station 22. Thus, the support substrate S can be directly loaded from the peeling-off station 14 into the second transfer region 24 without passing through the first transfer region 13, whereby the transfer of the support substrate S after the peeling process can be smoothly performed.

Further, the second transfer station 22 includes the mounting unit 221 for mounting the support substrate S and the moving unit 222 for moving the mounting unit 221 in the horizontal direction. With this configuration, since the mounting unit 221 mounting the support substrate S can move when the support substrate S is transferred between the first transfer station 21 and the second transfer region 24, it is not necessary to extend the non-contact holding unit of the transfer device 211 of the first transfer station 21 or the transfer arm of the second transfer device 241 of the second transfer region 24. Therefore, footprints of the first transfer station 21 and the second transfer region 24 can be reduced, whereby the overall footprint of the peeling system 1 can be reduced.

In the aforementioned peeling system 1, the first processing block 10 may include a mounting device for attaching the dicing frame F to the superposed substrate T. In this case, the superposed substrate T to which no dicing frame F is attached is taken out from the cassette Ct and is loaded into the mounting device, the dicing frame F is attached to the superposed substrate T in the mounting device, and then the superposed substrate T fixed to the dicing frame F is transferred to the peeling-off station 14. The mounting device may be arranged at an arbitrary position in the first processing block 10.

The first cleaning station 15 and the edge-cut station 16 installed in the first processing block 10 of the peeling system 1 may be installed outside the peeling system 1. Also, the second cleaning station 23 installed in the second processing block 20 may be installed outside the peeling system 1.

In the aforementioned peeling system 1, the processing devices or the transfer areas in the respective processing stations may be arranged arbitrarily. For example, the processing devices or the transfer areas may be arranged side-by-side in the horizontal direction or may be stacked in the vertical direction.

2. CONFIGURATION OF PEELING DEVICE

Figure 5:
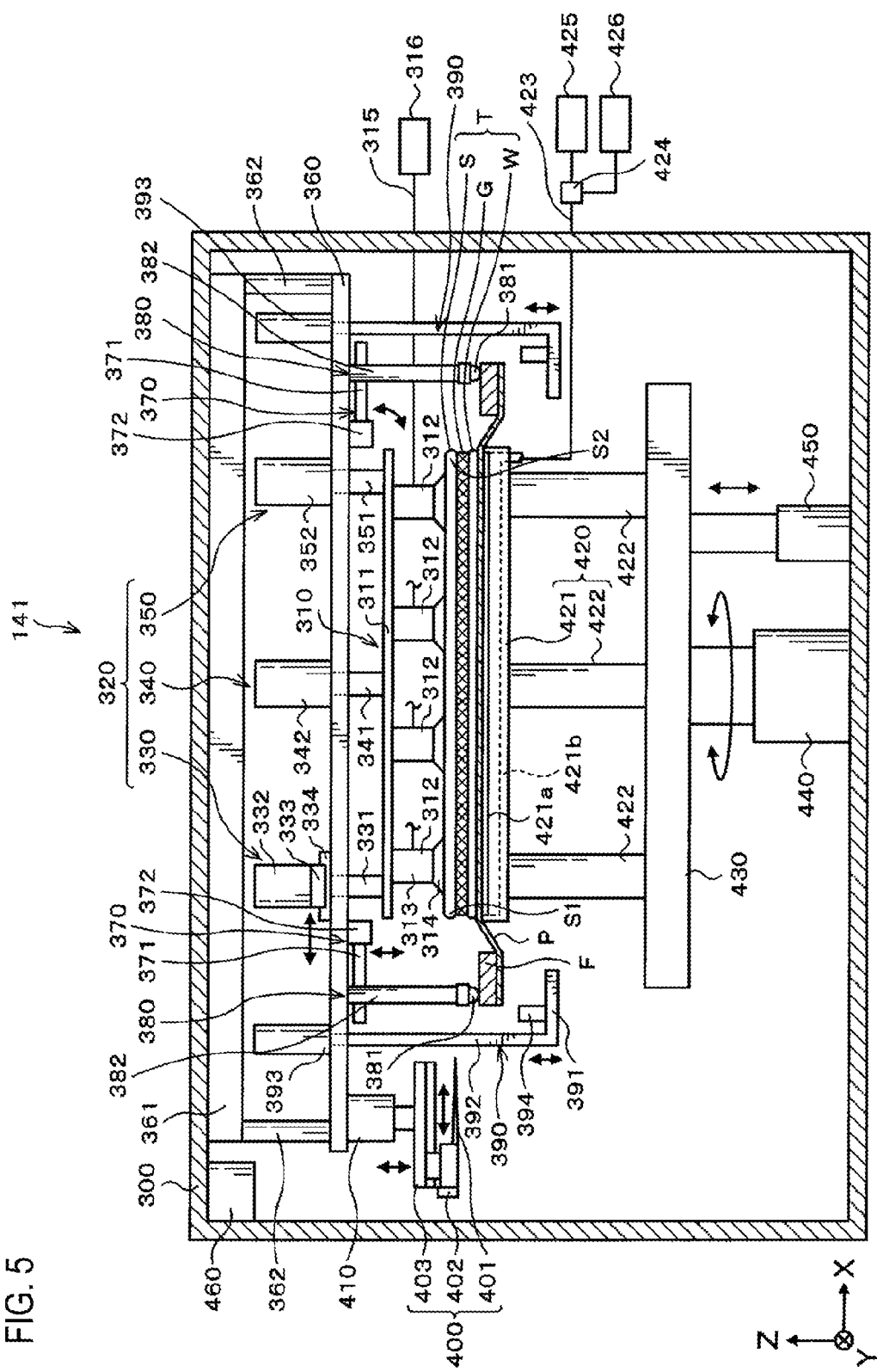
FIG. 5 is a vertical sectional view schematically illustrating a configuration of a peeling device.

Next, the configuration of the peeling devices 141 and 142 installed in the peeling-off station 14 will be described with reference to FIG. 5. FIG. 5 is a schematic side view illustrating the configuration of the peeling device 141 according to the present embodiment. The configuration of the peeling device 142 is the same as the configuration of the peeling device 141. Therefore, no description will be made on the configuration of the peeling device 142.

As illustrated in FIG. 5, the peeling device 141 includes a process vessel 300. A loading/unloading gate (not illustrated) for the target substrate W, the support substrate S and the superposed substrate T is formed on the side surface of the process vessel 300. An opening/closing shutter (not illustrated) is installed in the loading/unloading gate.

Within the process vessel 300, there are installed a first holding unit 310, a moving unit 320, an upper base portion 360, position adjusting units 370, pushdown units 380, delivery units 390, a peeling inducing unit 400, a movement adjusting unit 410, a second holding unit 420, a lower base portion 430, a rotating mechanism 440, an elevating mechanism 450 and an ionizer 460.

The first holding unit 310 holds the support substrate S of the superposed substrate T from above. The second holding unit 420 holds the target substrate W of the superposed substrate T from below. The first holding unit 310 is installed above the second holding unit 420. The support substrate S is disposed at the upper side and the target substrate W is disposed at the lower side. The moving unit 320 moves the support substrate S held by the first holding unit 310 away from the plate surface of the target substrate W. Thus, in the peeling device 141, the support substrate S held by the first holding unit 310 is continuously peeled off from the target substrate W from one end portion S1 thereof toward the other end portion S2. Hereinafter, the respective constituent elements will be described in detail.

Figure 6:
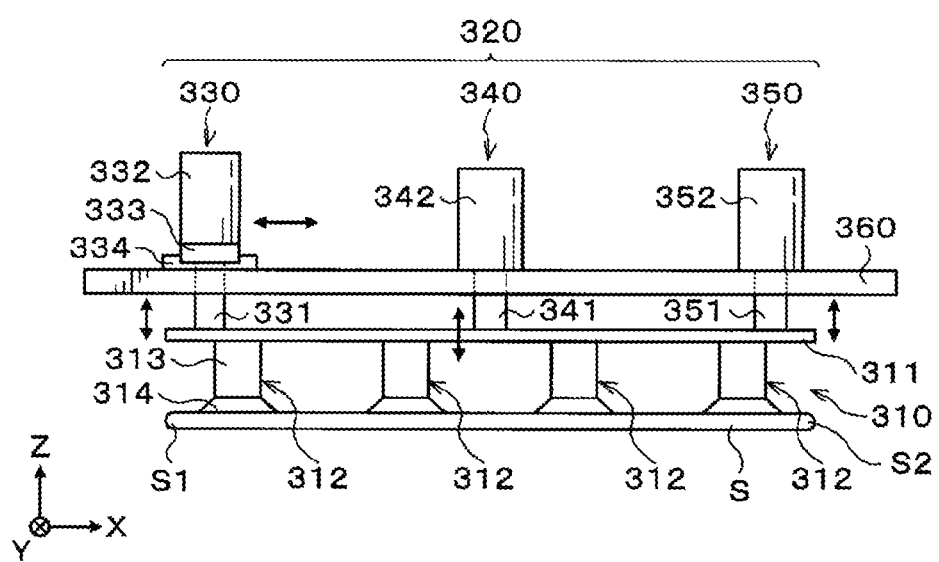
FIG. 6 is a side view schematically illustrating configurations of a first holding unit and a moving unit.

As illustrated in FIG. 6, the first holding unit 310 includes an elastic member 311 and a plurality of sucking parts 312. The elastic member 311 is a thin-plate-shaped member and is made of, e.g., metal such as sheet metal or the like. The elastic member 311 is disposed above the support substrate S so as to face the support substrate S.

The sucking parts 312 are installed on the surface of the elastic member 311 which faces the support substrate S. The arrangement and number of the sucking parts 312 may be arbitrarily set. For example, the sucking parts 312 are evenly disposed within the plane of the elastic member 311. Among the sucking parts 312, the sucking part 312 existing nearest to a peeling start point (at the X-axis direction negative side in this example) is disposed at the position corresponding to a peeling initiating part formed in the superposed substrate T by the peeling inducing unit 400 to be described later.

Each of the sucking parts 312 includes a body portion 313 fixed to the elastic member 311 and a sucking pad 314 installed at the lower end of the body portion 313.

As shown in FIG. 5, each of the sucking parts 312 is connected to an intake device 316, such as a vacuum pump or the like, through an intake pipe 315. The first holding unit 310 sucks up the non-bonding surface Sn of the support substrate S with the sucking parts 312 through the use of sucking forces generated by the intake device 316. Thus, the support substrate S is sucked and held by the first holding unit 310.

In some embodiments, the sucking pad 314 of each of the sucking parts 312 is of the type having a small deformation amount. This is because, if the sucking pad 314 is largely deformed when the below-described moving unit 320 pulls the first holding unit 310, there is a possibility that the sucked portion of the support substrate S is largely deformed along with the deformation of the sucking pad 314, eventually causing damage to the support substrate S or the target substrate W. Specifically, as the sucking pad 314, e.g., a pad having ribs formed on a sucking face thereof or a flat pad having a space height of 0.5 mm or less is used in some embodiments.

The moving unit 320 includes a first moving unit 330, a second moving unit 340 and a third moving unit 350. The first moving unit 330, the second moving unit 340 and the third moving unit 350 are supported by the upper base portion 360. The upper base portion 360 is supported through posts 362 by a fixing member 361 installed in a ceiling portion of the process vessel 300.

Figure 7:
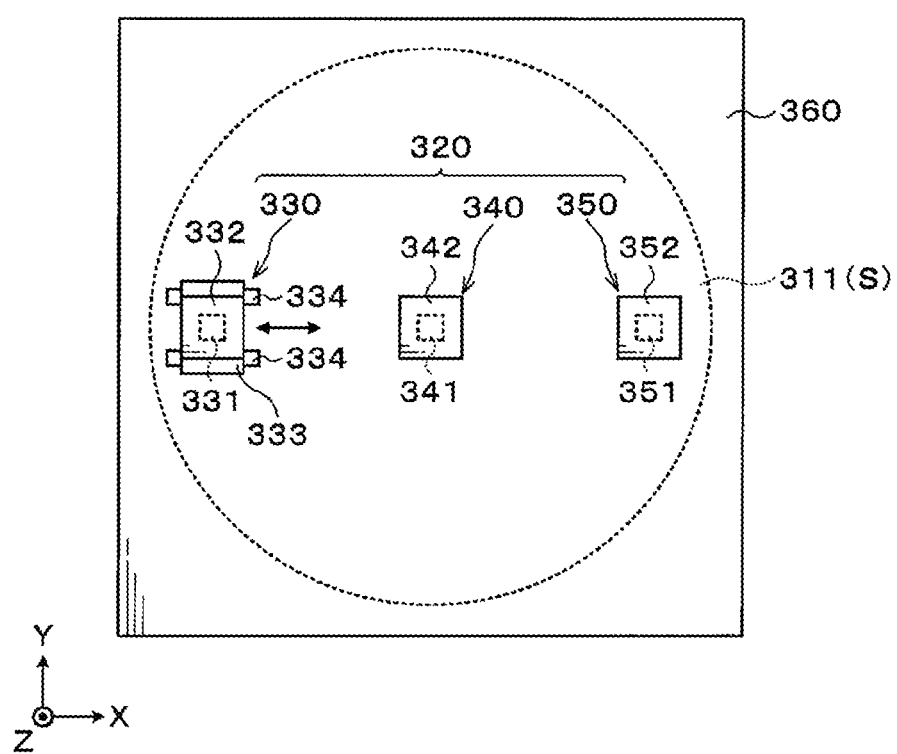
FIG. 7 is a plan view schematically illustrating the configuration of the moving unit.

As illustrated in FIGS. 6 and 7, the first moving unit 330, the second moving unit 340 and the third moving unit 350 are arranged side by side in the named order from the side of one end portion S1 of the support substrate S held by the first holding unit 310 toward the side of the other end portion S2 of the support substrate S, namely in the peeling direction of the superposed substrate T (in the X-axis positive direction). The first moving unit 330, the second moving unit 340 and the third moving unit 350 are configured to independently move the sucked and held regions of the elastic member 311 away from the second holding unit 420.

The first moving unit 330 includes a support member 331, a moving mechanism 332, a pedestal 333 and rails 334.

The support member 331 is a member extending in the vertical direction (the Z-axis direction). One end portion of the support member 331 is connected to the elastic member 311 while the other end portion of the support member 331 is connected to the moving mechanism 332 through the upper base portion 360 and the pedestal 333.

The moving mechanism 332 is configured to vertically move the support member 331 connected to the lower portion of the moving mechanism 332. The moving mechanism 332 is mounted on the pedestal 333. The pedestal 333 is configured such that it can move along a pair of rails 334 and 334 extending in the peeling direction (the X-axis positive direction) on the upper base portion 360. That is to say, the first moving unit 330 has a free end.

By moving the support member 331 vertically upward through the use of the moving mechanism 332, the first moving unit 330 pulls up the first holding unit 310 connected to the support member 331. At this time, along with the vertical upward movement of the support member 331, the moving mechanism 332 moves along the rails 334 in the peeling direction.

The second moving unit 340 includes a support member 341 and a moving mechanism 342. Similarly, the third moving unit 350 includes a support member 351 and a moving mechanism 352. The moving mechanisms 342 and 352 are fixed to the upper surface of the upper base portion 360 and are configured to vertically move the support members 341 and 351.

In the moving unit 320, the moving mechanism 332 is first operated. Then, the moving mechanism 342 is operated. Finally, the moving mechanism 352 is operated. That is to say, the moving unit 320 initially pulls the side of one end portion S1 of the support substrate S held by the first holding unit 310, subsequently pulls the central portion of the support substrate S and finally pulls the side of the other end portion S2 of the support substrate S. By doing so, the moving unit 320 gradually and continuously peels off the support substrate S from the target substrate W from one end portion S1 of the support substrate S toward the other end portion S2 thereof.

As illustrated in FIG. 5, the position adjusting units 370 are disposed above the first holding unit 310. The position adjusting units 370 are configured to adjust the position of the superposed substrate T, which is transferred to the peeling device 141 by the first transfer device 131 and is held by the second holding unit 420, so as to move to a predetermined position (e.g., a position coinciding with a sucking face 421a). In other words, the position adjusting units 370 are configured to perform centering of the superposed substrate T.

For example, the position adjusting units 370 are arranged at the positions corresponding to three points of the outer periphery of the superposed substrate T illustrated in FIG. 3 and are installed at a regular interval about the center of the superposed substrate T. The installation locations of the position adjusting units 370 are not limited to the three points. As an alternative example, the position adjusting units 370 may be installed at two points of the front and rear sides or the left and right sides of the outer periphery of the superposed substrate T or may be installed at four or more points at a regular interval about the center of the superposed substrate T.

Each of the position adjusting units 370 includes an arm 371 and a rotary movement mechanism 372 which rotates the arm 371. The arm 371 is an elongated member. The base end portion of the arm 371 is rotatably connected to the rotary movement mechanism 372. The longitudinal length of the arm 371 is set at such a value that, when the arm 371 is rotated by the rotary movement mechanism 372 until the tip portion of the arm 371 is oriented vertically downward, the tip portion of the arm 371 can make contact with the side surface of the superposed substrate T, more specifically the side surface of the support substrate S. Furthermore, the longitudinal length of the arm 371 is set at such a value that the arm 371 does not interfere with the dicing frame F during the rotational movement thereof. In this way, the arm 371 is configured such that it can move toward and away from the side surface of the superposed substrate T. The arm 371 may be made of different resins, e.g., polyoxymethylene (POM), celazole (PBI) or the like.

The rotary movement mechanism 372 is fixed to, e.g., the lower surface of the upper base portion 360, and is configured to rotationally move the arm 371 about the base end portion thereof. At this time, as set forth above, the arm 371 does not interfere with the dicing frame F during the rotational movement thereof. If the arm 371 of each of the position adjusting units 370 is rotationally moved by the rotary movement mechanism 372, the tip portion of the arm 371 makes contact with the side surface of the superposed substrate T (the side surface of the support substrate S). Thus, the superposed substrate T is position-adjusted so as to move to a predetermined position. By providing the position adjusting units 370 in this way, even if the superposed substrate T is held by the second holding unit 420 at a position shifted from a predetermined position, it is possible to move the superposed substrate T to a right position on the second holding unit 420, for example, a position coinciding with the sucking face 421a, thereby correcting the position of the superposed substrate T.

The pushdown units 380 for pushing the dicing frame F vertically downward are disposed at the outer side of the first holding unit 310. The pushdown units 380 are installed at three points of the outer periphery of the dicing frame E The pushdown units 380 are disposed at a regular interval about the center of the dicing frame F. While the pushdown units 380 are installed at three points in the illustrated example, this is illustrative and not limited thereto. As an alternative example, the pushdown units 380 may be installed at four or more points.

Each of the pushdown units 380 includes a ball bearing 381 and a support member 382. The ball bearing 381 is supported in the tip portion of the support member 382. The base end portion of the support member 382 is fixed to the lower surface of the upper base portion 360.

The ball bearing 381 makes contact with the surface of the dicing frame F and pushes the dicing frame F vertically downward with respect to the superposed substrate T. The dicing frame F is rotatably pushed down by the ball bearing 381. Thus, a space into which the below-described peeling inducing unit 400 can move is formed at the side of the side surface of the superposed substrate T. As a result, a sharp member (to be described later) of the peeling inducing unit 400 can be easily caused to come close to and make contact with the side surface of the superposed substrate T, more specifically the side surface of the support substrate S near the bonding agent G.

The delivery units 390 which deliver the superposed substrate T to the second holding unit 420 are disposed at the outer side of the first holding unit 310, more specifically at the outer side of the pushdown units 380. The delivery units 390 are respectively installed at the positions corresponding to two points of the left and right sides of the dicing frame E While the delivery units 390 are installed at two points in the illustrated example, this is illustrative and not limited thereto. As an alternative example, the delivery units 390 may be installed at three or more points.

Each of the delivery units 390 includes a horizontal holding member 391, a vertical support member 392 and a moving mechanism 393. A guide portion 394 is installed in the horizontal holding member 391 of each of the delivery units 390.

The horizontal holding member 391 extends in the horizontal direction. The guide portion 394 is installed on the horizontal holding member 391. The guide portion 394 performs position adjustment such that the superposed substrate T held on the horizontal holding member 391 is positioned at a predetermined position with respect to the second holding unit 420. That is to say, the guide portion 394 adjusts the position of the superposed substrate T prior to the position of the superposed substrate T being adjusted by the position adjusting units 370.

The vertical support member 392 extends in the vertical direction and supports the horizontal holding member 391. The base end portion of the vertical support member 392 is supported by the moving mechanism 393. The moving mechanism 393 is fixed to the upper surface of the upper base portion 360 and is configured to move the vertical support member 392 in the vertical direction.

Each of the delivery units 390 moves the vertical support member 392, the horizontal holding member 391 and the guide portion 394 along the vertical direction using the moving mechanism 393. Thus, the horizontal holding member 391 which has received the superposed substrate T from the first transfer device 131 is moved in the vertical direction, thereby delivering the superposed substrate T to the second holding unit 420.

The peeling inducing unit 400 is disposed at the outer side of the first holding unit 310, more specifically at the outer side of the delivery units 390. The peeling inducing unit 400 is configured to form a part, which triggers peeling off the support substrate S from the target substrate W, on the side surface of one end portion S1 of the superposed substrate T.

The peeling inducing unit 400 includes a sharp member 401, a load cell 402 and moving mechanism 403. The sharp member 401 is, e.g., a cutter, and is supported by the moving mechanism 403 such that the tip portion of the sharp member 401 protrudes toward the superposed substrate T. As the sharp member 401, it may be possible to use, e.g., a razor blade, a roller blade or an ultrasonic cutter. The load cell 402 is installed in one end portion of the sharp member 401 and is configured to detect a force (load) applied to the sharp member 401.

The moving mechanism 403 moves the sharp member 401 along a rail extending in the X-axis direction. The peeling inducing unit 400 moves the sharp member 401 through the use of the moving mechanism 403, thereby bringing the sharp member 401 into contact with the side surface of the support substrate S near the bonding agent G. Thus, the peeling inducing unit 400 forms a part, which triggers the peeling off the support substrate S from the target substrate W (hereinafter referred to as a "peeling initiating part"), on the side surface of one end portion S1 of the superposed substrate T.

The moving mechanism 403 is supported from above by the movement adjusting unit 410. The movement adjusting unit 410 is fixed to, e.g., the lower surface of the upper base portion 360, and is configured to move the moving mechanism 403 along the vertical direction. This makes it possible to adjust the height position of the sharp member 401, namely the contact position at which the sharp member 401 makes contact with the side surface of the superposed substrate T.

The second holding unit 420 is disposed below the first holding unit 310 so as to face the first holding unit 310. For example, a porous chuck is used as the second holding unit 420. The second holding unit 420 includes a disc-shaped body portion 421 and a post member 422 which supports the body portion 421. The post member 422 is supported on the lower base portion 430 to be described later.

The body portion 421 is made of a metallic material, e.g., aluminum. A sucking face 421a is formed on the front surface of the body portion 421. The sucking face 421a has a diameter substantially equal to that of the superposed substrate T and makes contact with the lower surface of the superposed substrate T, namely the non-bonding surface Wn of the target substrate W. The sucking face 421a is made of, e.g., a porous material such as a silicon carbide or the like, or a porous ceramic.

A suction space 421b communicating with the outside through the sucking face 421a is formed within the body portion 421. A pipe line 423 is connected to the suction space 421b. The pipe line 423 is branched into two pipe lines at a valve 424. An intake device 425, e.g., a vacuum pump, is connected to one of the branched pipe lines 423. A sensor (not illustrated) which measures an intake pressure of the intake device 425, namely a suction pressure when the second holding unit 420 sucks the target substrate W, is installed in the intake device 425. A gas supply source 426 which reserves a gas, e.g., a nitrogen gas or an air therein is connected to the other branched pipe line 423.

Using a negative pressure generated by the intake of the intake device 425, the second holding unit 420 causes the non-bonding surface Wn of the target substrate W to be sucked to the sucking face 421a through the dicing tape P. Thus, the second holding unit 420 holds the target substrate W. Moreover, the second holding unit 420 may jet a gas from the surface thereof to hold the target substrate W in a floating state. While there is illustrated an example in which the second holding unit 420 is a porous chuck, the second holding unit 420 may be, e.g., an electrostatic chuck.

The lower base portion 430 is disposed below the second holding unit 420 and is configured to support the second holding unit 420. The lower base portion 430 is supported by the rotating mechanism 440 and the elevating mechanism 450 which are fixed to the floor surface of the process vessel 300.

The rotating mechanism 440 rotates the lower base portion 430 about a vertical axis. Thus, the second holding unit 420 supported on the lower base portion 430 is rotated. The elevating mechanism 450 moves the lower base portion 430 in the vertical direction. Thus, the second holding unit 420 supported on the lower base portion 430 is moved up and down.

The ionizer 460 is installed in the ceiling portion of the process vessel 300. The ionizer 460 is configured to remove the static electricity generated during the peeling-off of the superposed substrate T. This makes it possible to properly perform the peeling process of the superposed substrate T. It is also possible to suppress damage of electronic circuits formed on the target substrate W.

3. OPERATION OF PEELING DEVICE

Figure 8:
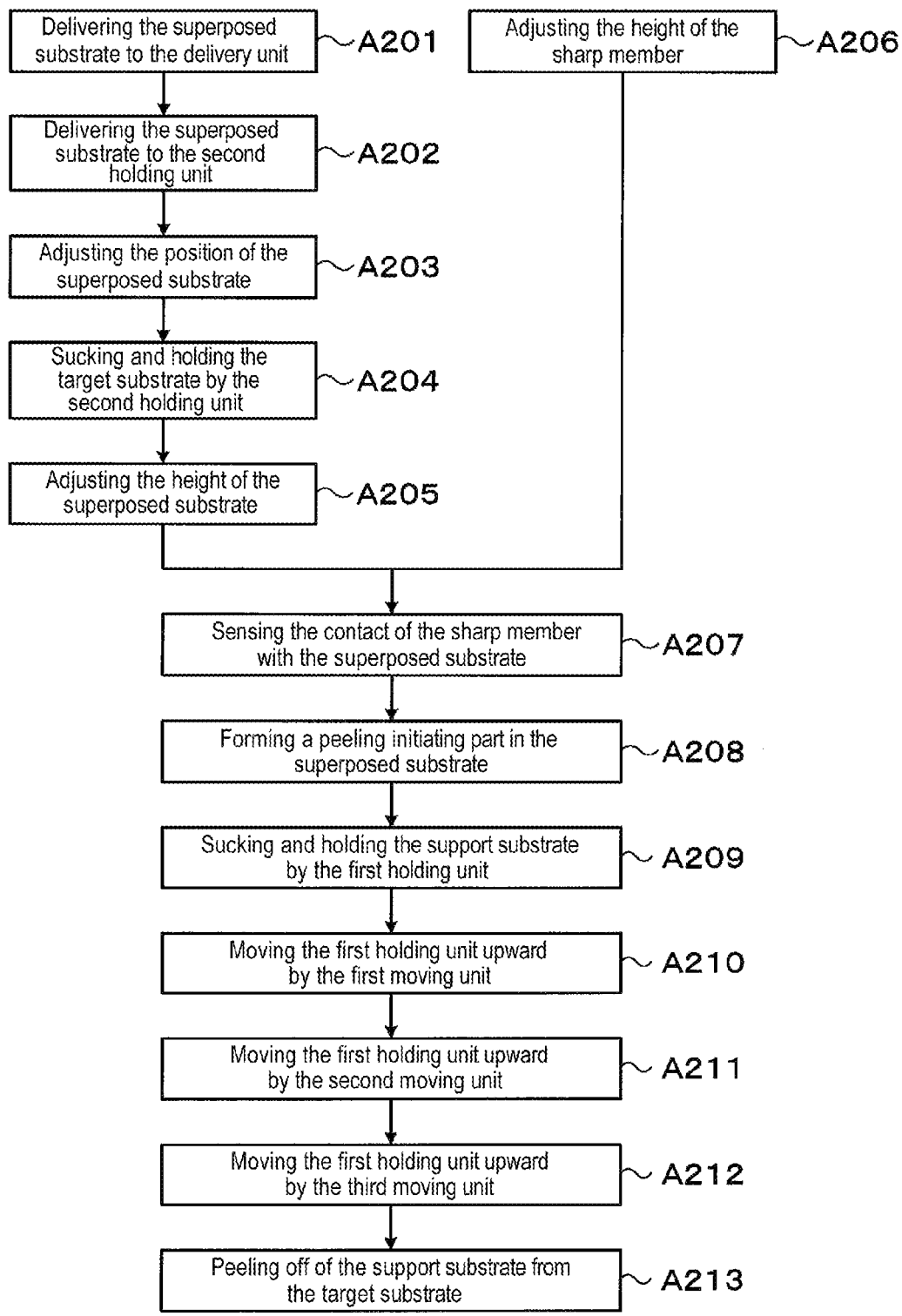
FIG. 8 is a flowchart illustrating a sequence of a peeling process implemented by the peeling device.

Next, a description will be made on a method of peeling off the support substrate S from the target substrate W, which is implemented by the peeling device 141. FIG. 8 is a flowchart illustrating an example of major steps of a peeling process. FIGS. 9 to 15 are explanatory views of the peeling process. Under the control of the control device 30, the peeling device 141 executes the respective processing sequences illustrated in FIG. 8.

First, the superposed substrate T loaded to the peeling device 141 by the first transfer device 131 is delivered to the delivery units 390 (Step A201 in FIG. 8). The superposed substrate T delivered to the delivery units 390 is position-adjusted by the guide portion 394 such that the superposed substrate T is positioned at a predetermined position with respect to the second holding unit 420. At this time, the second holding unit 420 is positioned below the delivery units 390. In the second holding unit 420, the gas supplied from the gas supply source 426 to the sucking face 421a is being jetted to suppress clogging of holes formed on the sucking face 421a.

Thereafter, the second holding unit 420 is moved up and the superposed substrate T is delivered to the second holding unit 420 from the delivery units 390 (Step A202 in FIG. 8). At this time, the gas is being jetted from the sucking face 421a of the second holding unit 420, whereby the superposed substrate T is held by the second holding unit 420 in a state in which the superposed substrate T floats away from the second holding unit 420. The gap between the superposed substrate T and the sucking face 421a is small and the superposed substrate T is appropriately held by the second holding unit 420.

Then, the second holding unit 420 is further moved up and the superposed substrate T held on the second holding unit 420 is position-adjusted by the position adjusting units 370 so as to move to a predetermined position (Step A203 in FIG. 8). Specifically, the arm 371 is rotationally moved by the rotary movement mechanism 372. At this time, the longitudinal length of the arm 371 is suitably set. This eliminates the possibility that the arm 371 interferes with the dicing frame F during the rotational movement thereof. If the arm 371 of each of the position adjusting units 370 is rotationally moved by the rotary movement mechanism 372, the tip portion of the arm 371 makes contact with the side surface of the support substrate S. Thus, the superposed substrate T is position-adjusted so as to move to a predetermined position. Since the arm 371 makes contact with the side surface of the support substrate S, there is no possibility that the target substrate W as a product is damaged.

Subsequent to Step A202, at Step A203, the gas is being injected from the sucking face 421a of the second holding unit 420, whereby the superposed substrate T is kept floating away from the second holding unit 420. In this case, the superposed substrate T can be moved with ease. This enables the position adjusting units 370 to smoothly perform the position adjustment of the superposed substrate T.

Thereafter, by switching the valve 424, the supply of the gas from the gas supply source 426 to the second holding unit 420 is stopped and the suction using the intake device 425 is started. Then, the target substrate W is sucked and held by the second holding unit 420 with the dicing tape P interposed therebetween (Step A204 in FIG. 8).

Figure 9:
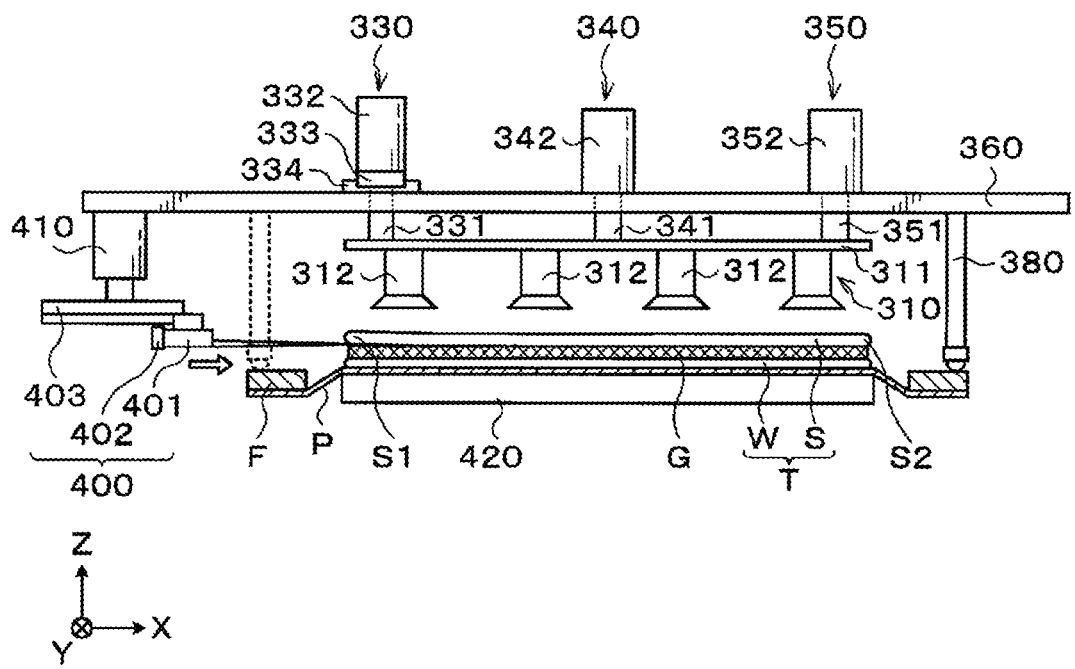
FIG. 9 is an explanatory view of a peeling operation performed by the peeling device.

Subsequently, as illustrated in FIG. 9, the second holding unit 420 is further moved up and the superposed substrate T held on the second holding unit 420 is disposed at a predetermined position where a peeling process is implemented (Step A205 in FIG. 8). At this time, the dicing frame F is pushed vertically downward with respect to the superposed substrate T by the pushdown units 380. As a result, a space into which the peeling inducing unit 400 can move is formed at the side of the side surface of the superposed substrate T.

During the time when Steps A201 to A205 are performed, the height of the sharp member 401 is adjusted by the movement adjusting unit 410 (Step A206 in FIG. 8).

Thereafter, the sharp member 401 of the peeling inducing unit 400 is moved toward the superposed substrate T and is brought into contact with the support substrate S. At this time, the contact of the sharp member 401 with the support substrate S is sensed using one or both of the load cell 402 and the moving mechanism 403 (Step A207 in FIG. 8). That is to say, the contact of the sharp member 401 with the support substrate S may be sensed by measuring a force applied to the sharp member 401 through the use of the load cell 402 and detecting a change in the force. Alternatively, the contact of the sharp member 401 with the support substrate S may be sensed by measuring a torque of a motor installed within the moving mechanism 403 and detecting a change in the torque. In addition, the contact of the sharp member 401 with the support substrate S may be sensed when a change in the force measured by the load cell 402 is detected and when a change in the torque of the motor of the moving mechanism 403 is detected.

Figure 10:
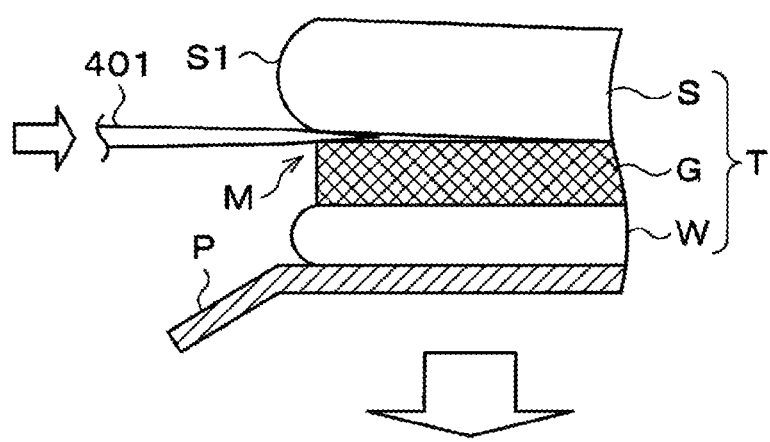
FIG. 10 is an explanatory view of a peeling inducing process.

Thereafter, as illustrated in FIG. 9, the sharp member 401 is further moved forward and a peeling inducing process is performed (Step A208 in FIG. 8). The peeling inducing process is performed before the support substrate S is held by the first holding unit 310, namely while the support substrate S is kept free. Then, if a peeling initiating part M is formed on the side surface of one end portion S1 of the superposed substrate T by moving the sharp member 401 forward as illustrated in FIG. 10, the sharp member 401 is further moved forward while moving the second holding unit 420 downward through the use of the elevating mechanism 450. Thus, a downwardly-acting force is applied to the target substrate W and the bonding agent G and an upwardly-acting force is applied to the support substrate S supported by the sharp member 401. As a result, the peeling initiating part M is enlarged.

Figure 11:
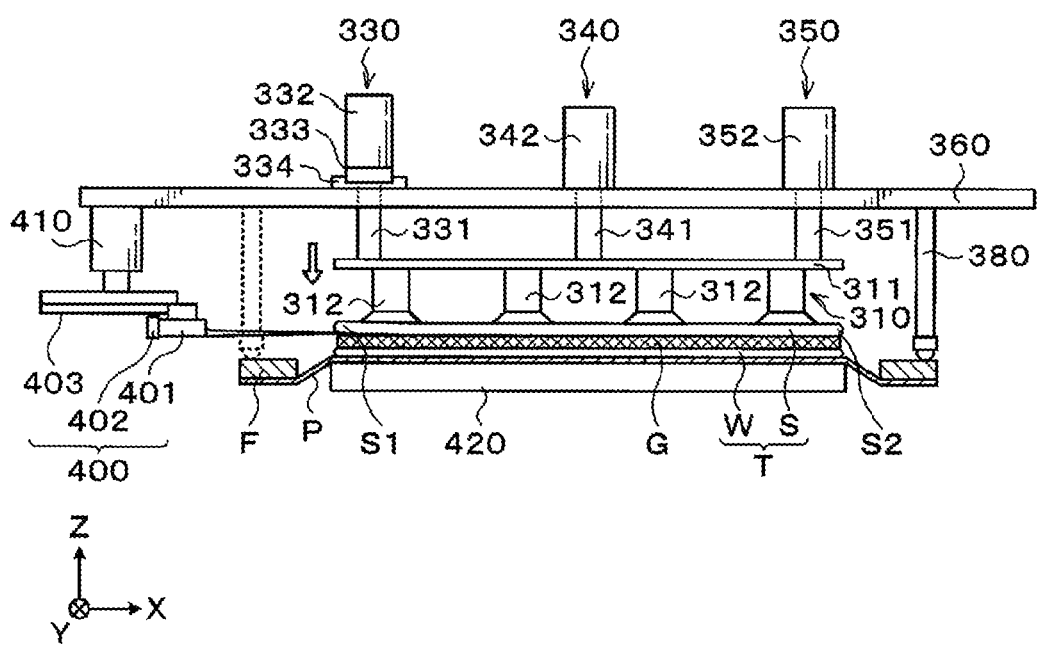
FIGS. 11 to 13 are explanatory views of the peeling operation performed by the peeling device.

Thereafter, as illustrated in FIG. 11, the elastic member 311 of the first holding unit 310 is moved down by the first moving unit 330, the second moving unit 340 and the third moving unit 350, thereby bringing the sucking parts 312 into contact with the support substrate S. Then, the non-bonding surface Sn of the support substrate S is held by the first holding unit 310 (Step A209 in FIG. 8).

Figure 12:
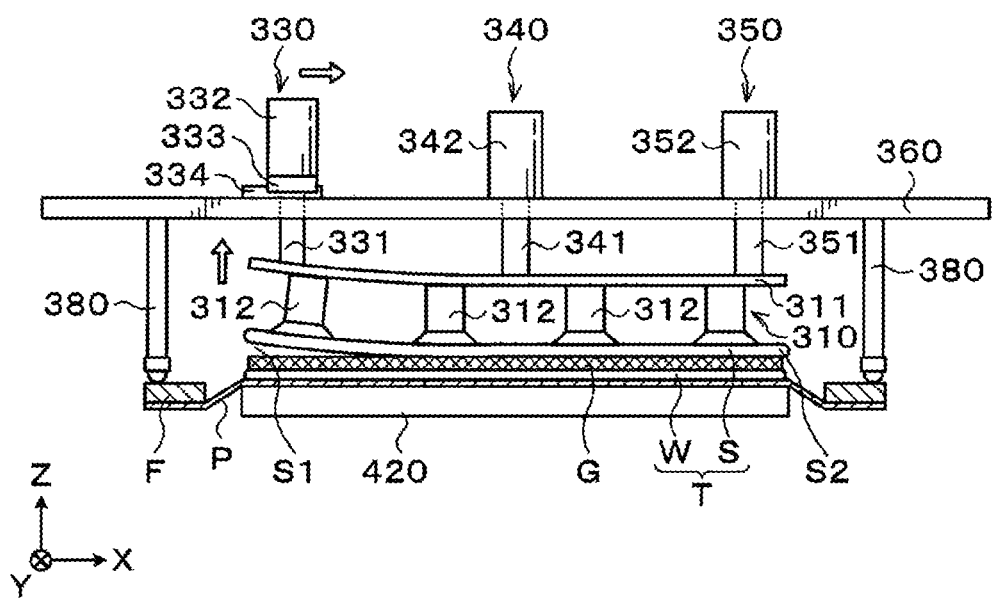

Thereafter, as illustrated in FIG. 12, the outer periphery portion of the elastic member 311 is moved up by the first moving unit 330 (Step A210 in FIG. 8). That is to say, the outer periphery portion of one end portion S1 of the support substrate S corresponding to the peeling initiating part M is pulled upward. Thus, the support substrate S begins to be continuously peeled off from the target substrate W from the outer periphery portion toward the central portion, wherein the peeling initiating part M serves as a start point of the peeling-off.

Figure 13:
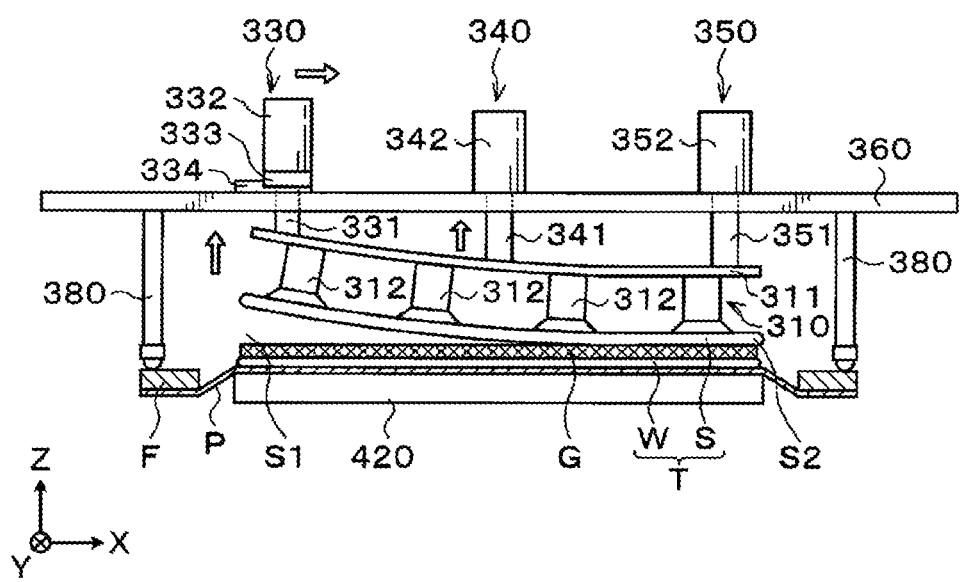

Subsequently, as illustrated in FIG. 13, the central portion of the elastic member 311 is moved upward by the second moving unit 340 while continuously moving the outer periphery portion of the elastic member 311 upward through the use of the first moving unit 330 (Step A211 in FIG. 8). That is to say, the central portion of the support substrate S is further pulled upward while pulling the outer periphery portion of one end portion S1 of the support substrate S upward. When the outer periphery portion of the elastic member 311 is moved up to a target height by the first moving unit 330, a peeling-off portion where the support substrate S is peeled-off from the target substrate W reach the other end portion S2 of the support substrate S. Thus, the entire surface of the support substrate S is peeled off from the target substrate W.

At Steps A210 and A211, as the support member 331 of the first moving unit 330 is moved vertically upward, the moving mechanism 332 is moved in the peeling direction (the X-axis positive direction) along the rails 334. Consequently, one end portion S1 of the support substrate S held by the first holding unit 310 is also moved in the peeling direction while being moved vertically upward by the moving mechanism 332.

Figure 14:
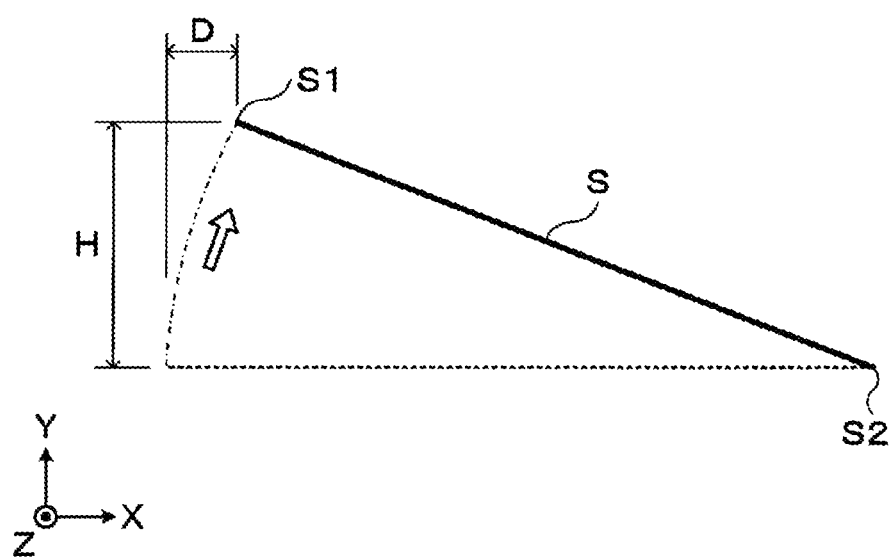
FIG. 14 is an explanatory view schematically illustrating the movement of a support substrate in the peeling process.

FIG. 14 is an explanatory view schematically illustrating the movement of the support substrate S. One end portion S1 of the support substrate S is moved vertically upward by a height H and is also moved in the peeling direction by a distance D. It is therefore possible to reduce the peeling direction force acting on the peeling-off portion between the support substrate S and the target substrate W (the other end portion S2 of the support substrate S in FIG. 14). That is to say, an unnecessary force does not act on the peeling-off portion. This makes it possible to restrain the target substrate W and the support substrate S from being damaged.

The elastic member 311 of the first holding unit 310 has elasticity. Therefore, when the first moving unit 330 and the second moving unit 340 pull the elastic member 311 at Steps A210 and A211, the elastic member 311 is flexibly deformed in response to the pulling operation. This makes it possible to further reduce the peeling direction force acting on the peeling-off portion between the support substrate S and the target substrate W.

In other words, the distance D of movement of one end portion S1 of the support substrate S in the peeling direction can be shortened just as much as the reduction in the force acting on the peeling-off portion due to the flexibility of the elastic member 311. For example, if the diameter of the support substrate S (or the target substrate W) is 300 mm, the distance D can be reduced to 10 mm to 30 mm. In other words, the length of the rails 334 can be reduced to 10 mm to 30 mm.

Furthermore, since the elastic member 311 has flexibility, it is possible to give "persistency" to the force by which the support substrate S is peeled off from the target substrate W. This makes it possible to efficiently peel off the support substrate S from the target substrate W.

Figure 15:
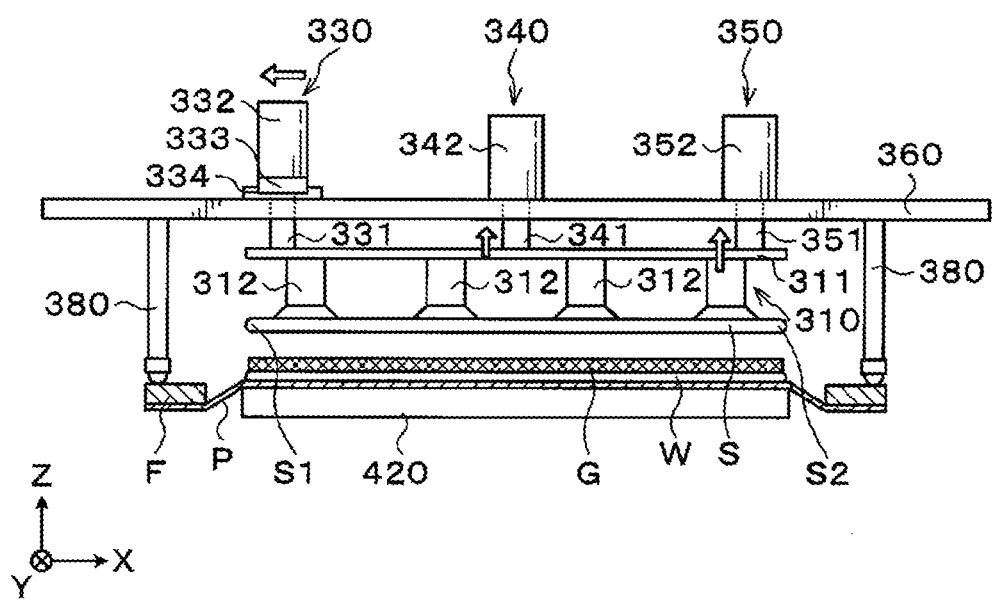
FIG. 15 is an explanatory view of the peeling operation performed by the peeling device.

Thereafter, as illustrated in FIG. 15, the outer periphery portion of the elastic member 311 is moved upward by the third moving unit 350 while continuously moving the central portion of the elastic member 311 upward by the second moving unit 340 (Step A212 in FIG. 8). When the central portion and the outer periphery portion of the elastic member 311 are moved up to a target position by the second moving unit 340 and the third moving unit 350, the elastic member 311 is returned to a horizontal posture. For that reason, the moving mechanism 332 of the first moving unit 330 is moved along the rails 334 in the direction opposite to the peeling direction (in the X-axis negative direction). Thus, the support substrate S held by the first holding unit 310 takes a horizontal posture, whereby the support substrate S is peeled off from the target substrate W (Step A213 in FIG. 8). In this way, a series of peeling processes for the target substrate W and the support substrate S performed in the peeling device 141 is completed.

According to the present embodiment, at Steps A210 and A211, the moving mechanism 332 moves along the rails 334 in the peeling direction as the support member 331 of the first moving unit 330 is moved vertically upward. As a result, one end portion S1 of the support substrate S held by the first holding unit 310 is moved in the peeling direction while moving vertically upward. This makes it possible to reduce the peeling direction force acting on the peeling-off portion between the support substrate S and the target substrate. That is to say, an unnecessary force does not act on the peeling-off portion. It is therefore possible to restrain the target substrate W and the support substrate S from being damaged. Accordingly, it is possible to properly perform the peeling process of the target substrate W and the support substrate S.

The elastic member 311 of the first holding unit 310 has elasticity. Therefore, when first moving unit 330 and the second moving unit 340 pull the elastic member 311 at Steps A210 and A211, the elastic member 311 is flexibly deformed in response to the pulling operation. This makes it possible to further reduce the peeling direction force acting on the peeling-off portion between the support substrate S and the target substrate W.

4. OTHER EMBODIMENTS

Next, a description will be made on other configurations of the moving unit 320 of the peeling device 141.

Figure 16:
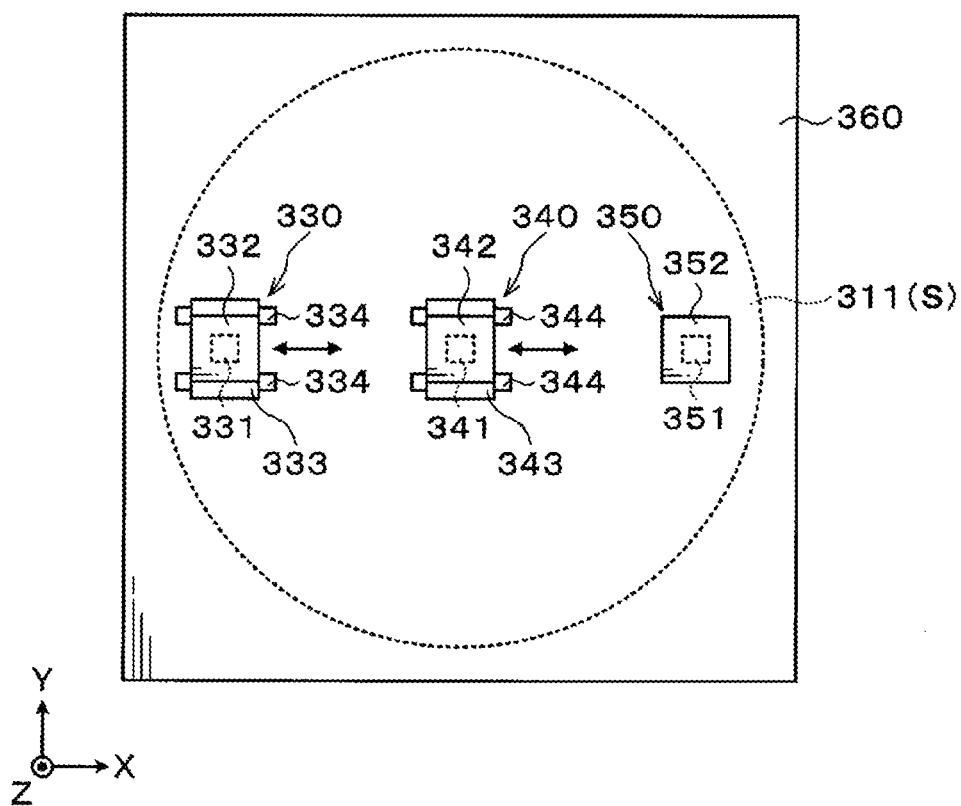
FIGS. 16 to 19 are plan views schematically illustrating a configuration of a moving unit according to another embodiment.

For example, as illustrated in FIG. 16, just like the first moving unit 330, the second moving unit 340 may be configured such that it can move in the peeling direction. The second moving unit 340 further includes a pedestal 343 and rails 344 as well as the support member 341 and the moving mechanism 342. The configurations of the pedestal 343 and the rails 344 are the same as the configurations of the pedestal 333 and the rails 334 of the first moving unit 330. Therefore, no description will be made thereon.

In this case, at Step A211, along with the vertical upward movement of the support member 341 by the second moving unit 340 as well as the peeling direction movement of the moving mechanism 332 of the first moving unit 330, the moving mechanism 342 moves along the rails 344 in the peeling direction. Thus, the force acting on the peeling-off portion between the support substrate S and the target substrate W can be made more uniform in the peeling direction. This makes it possible to properly perform the peeling process of the target substrate W and the support substrate S.

In some embodiments, the moving mechanism 352 of the third moving unit 350 is not moved in the peeling direction but is kept fixed. The reason is that, when peeling off the support substrate S from the target substrate W from one end portion S1 thereof toward the other end portion S2, the third moving unit 350 installed at the side of the other end portion S2 serves as a fulcrum.

Figure 17:
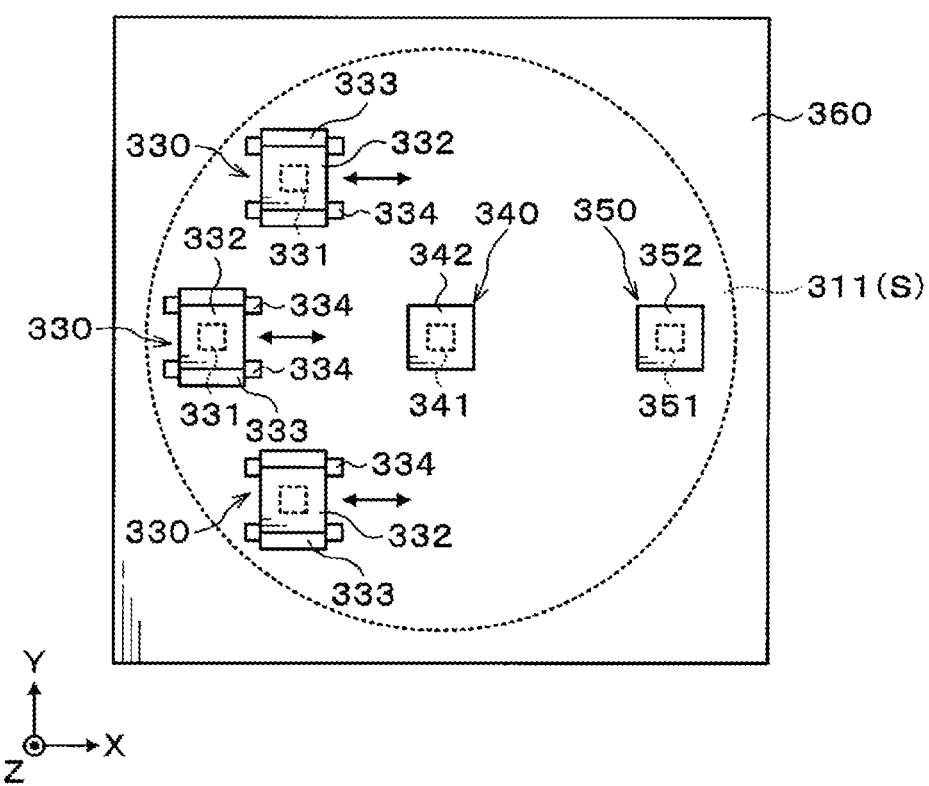

For example, as illustrated in FIG. 17, a plurality of first moving units 330 may be arranged side by side in the direction orthogonal to the peeling direction (in the Y-axis direction). In this case, at Steps A210 and A211, a plurality of moving mechanisms 332 is moved in the peeling direction. Thus, the force acting on the peeling-off portion between the support substrate S and the target substrate W can be made more uniform in the peeling direction. It is therefore possible to properly perform the peeling process of the target substrate W and the support substrate S.

Figure 18:
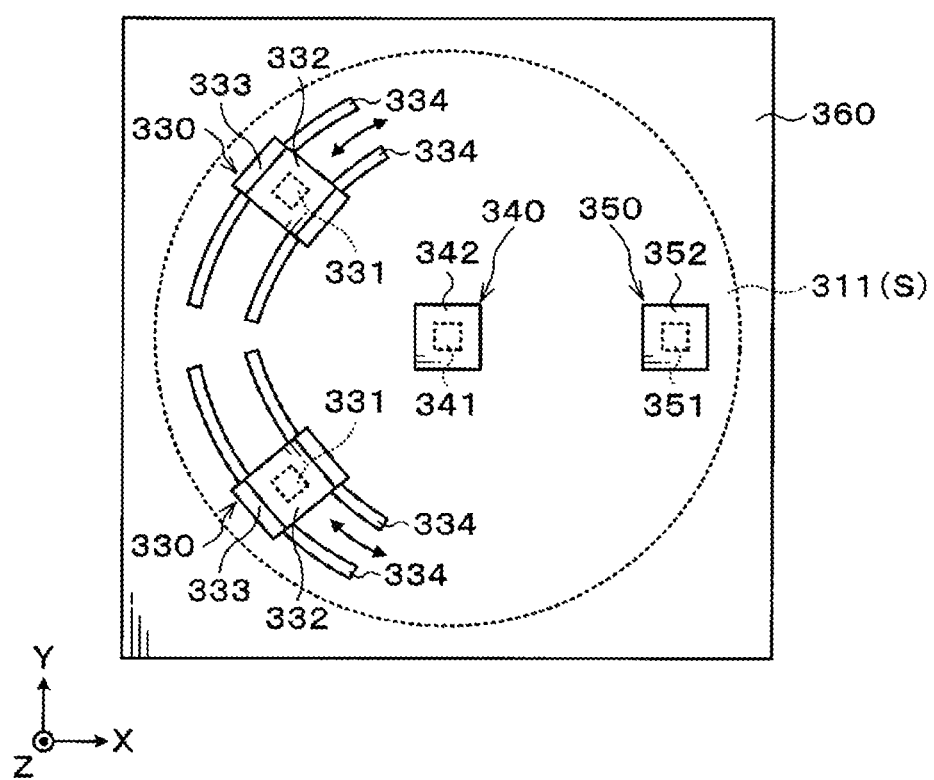

For example, as illustrated in FIG. 18, the first moving units 330 may be configured such that they can move in a direction extending along the peripheral edge of the support substrate S. That is to say, two pairs of rails 334 and 334 extend in the direction extending along the peripheral edge of the support substrate S. Two first moving units 330 are arranged side by side in the direction orthogonal to the peeling direction.

In this case, the force acting on the peeling-off portion between the support substrate S and the target substrate W acts in the direction tangential to the direction extending along the peripheral edge of the support substrate S when seen in a plan view. Thus, the force acting on the peeling-off portion between the support substrate S and the target substrate W can be made more uniform in the peeling direction. It is therefore possible to properly perform the peeling process of the target substrate W and the support substrate S.

Figure 19:
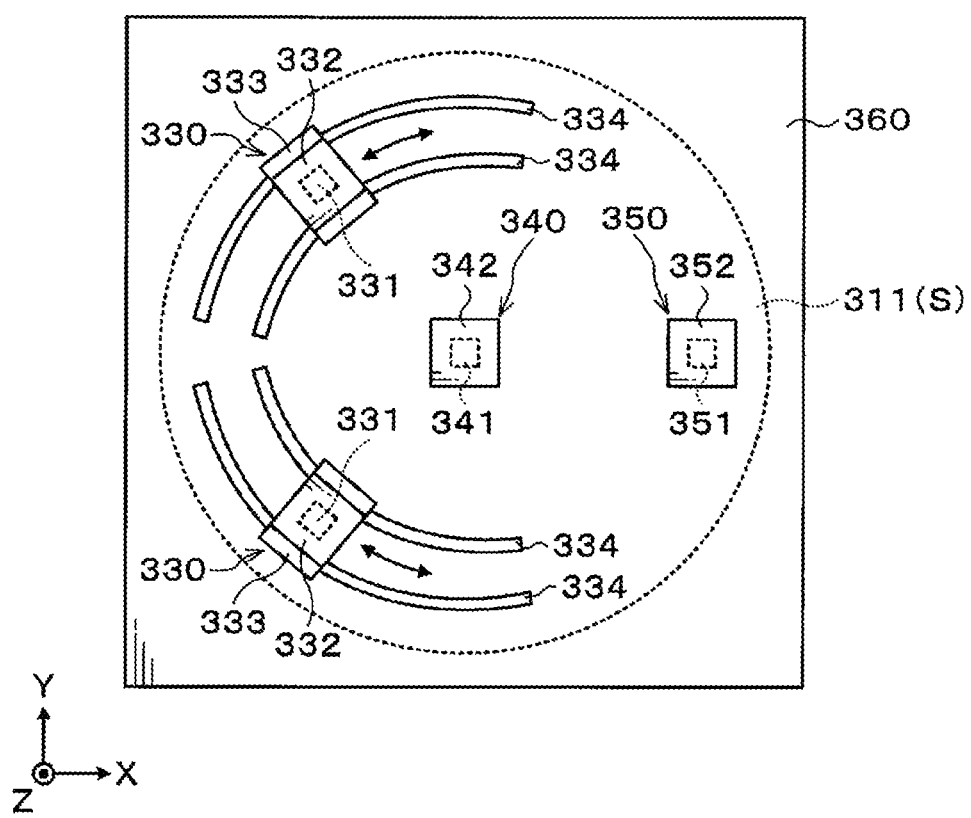

In the example illustrated in FIG. 18, the rails 334 extend substantially in the shape of one quarter of a circle. However, as illustrated in FIG. 19, the rails 334 may extend longer along the peripheral edge of the support substrate S. In this case, the degree of freedom of movement of the moving mechanism 332 is increased and the degree of freedom of the peeling process of the target substrate W and the support substrate S is also increased.

Figure 20:
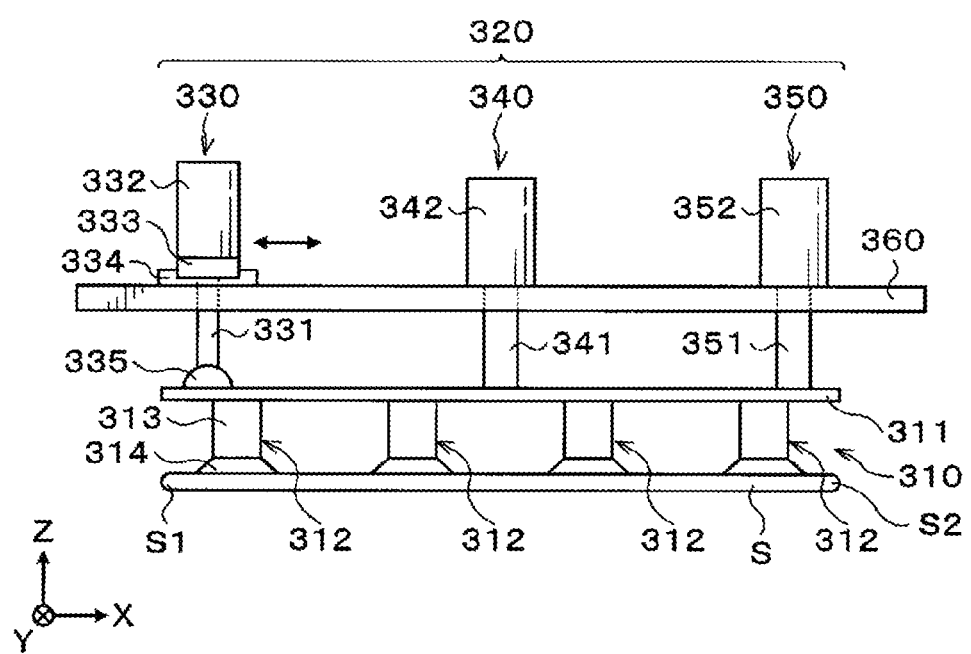
FIG. 20 is a side view schematically illustrating a configuration of a moving unit according to another embodiment.

For example, as illustrated in FIG. 20, the first moving unit 330 may further include a ball bearing 335. The ball bearing 335 is installed on an upper portion of the elastic member 311 and is connected to the support member 331.

Figure 21:
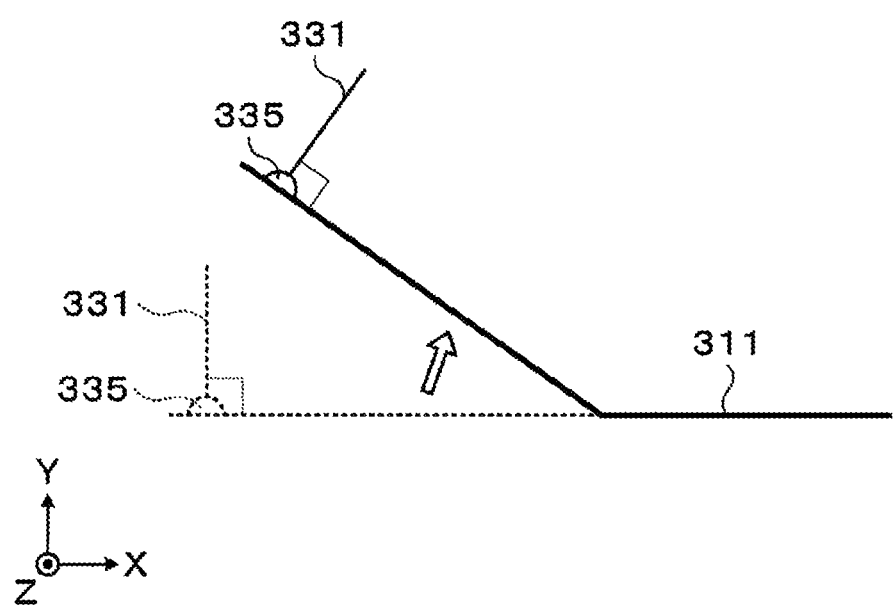
FIG. 21 is an explanatory view schematically illustrating a force that acts on an elastic member in a peeling process according to another embodiment.

In this case, at Steps A210 and A211, when the moving mechanism 332 is moved along the rails 334 in the peeling direction while the support member 331 is moved vertically upward, the support member 331 rotates about the ball bearing 335. That is to say, as illustrated in FIG. 21, even if the peeling off of the support substrate S from the target substrate W proceeds, the support member 331 is always positioned so as to extend in a direction orthogonal to the elastic member 311. Thus, when seen in a side view, the direction of the force acting on the elastic member 311 is always orthogonal to the extension direction of the elastic member 311. As a result, the force acting on the peeling-off portion between the support substrate S and the target substrate W can be made more uniform in the peeling direction. It is therefore possible to properly perform the peeling process of the target substrate W and the support substrate S.

Figure 22:
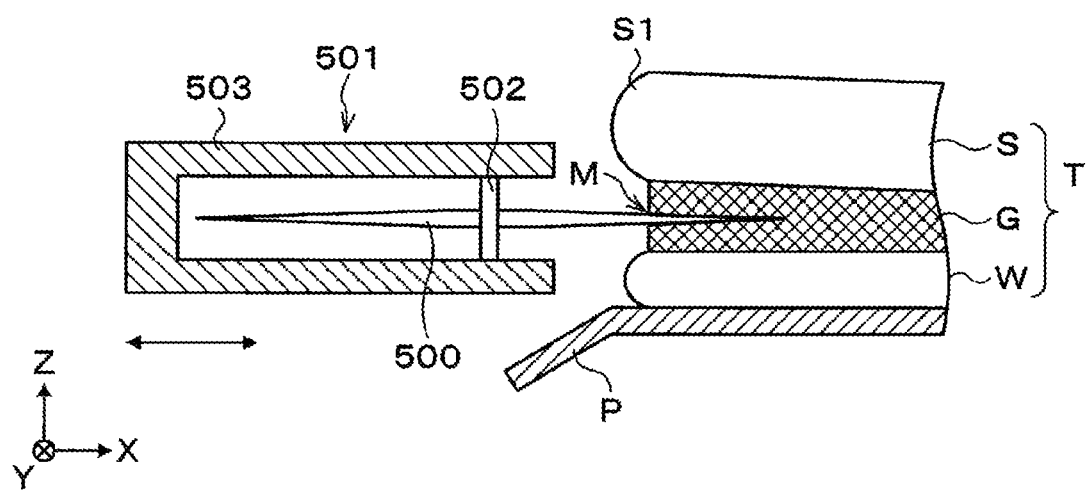
FIG. 22 is a side view schematically illustrating a configuration of a peeling inducing unit according to another embodiment.
Figure 23:
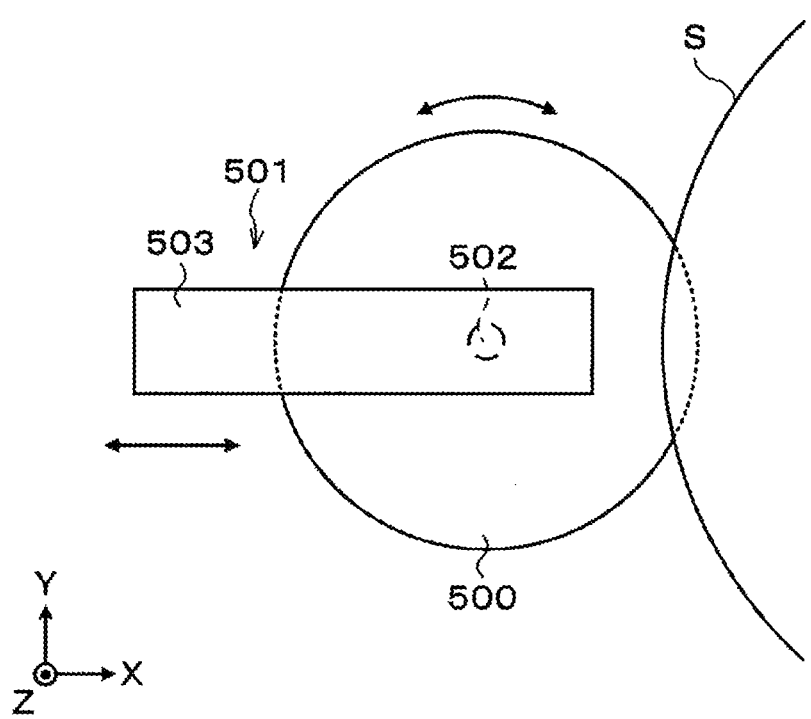
FIG. 23 is a plan view schematically illustrating the configuration of the peeling inducing unit according to another embodiment.

Next, a description will be made on another configuration of the peeling inducing unit 400 of the peeling device 141. As illustrated in FIGS. 22 and 23, the peeling inducing unit 400 is provided with a sharp member 500 and a rotating unit 501 in place of the sharp member 401. The sharp member 500 has a disc-like shape. The entire outer periphery of the sharp member 500 is sharpened.

The rotating unit 501 includes a rotating shaft 502 and a rotating mechanism 503. The rotating shaft 502 extends in the vertical direction. The rotating shaft 502 is installed so as to penetrate through the central portion of the sharp member 500. The rotating mechanism 503 rotates the sharp member 500 about the rotating shaft 502. The rotating mechanism 503 can be moved in the X-axis direction by the moving mechanism 403. A load cell 402 is installed in the rotating mechanism 503.

At Step A208, the sharp member 500 is brought into contact with the bonding agent G existing at the side of one end portion S1 while the rotating unit 501 rotates the sharp member 500. By doing so, a peeling initiating part M is formed on the side surface of the bonding agent G. In this case, the entire periphery of the sharp member 500 is used in forming the peeling initiating part M. This makes it possible to reliably form the peeling initiating part M. Furthermore, as compared with, e.g., a case where one point of the sharp member is used, it is possible to prolong the lifespan of the sharp member 500 and to reduce the replacement frequency thereof. Accordingly, it is possible to improve the yield rate of products.

In the aforementioned embodiments, there has been described an example where the superposed substrate to be peeled off is the superposed substrate T produced by bonding the target substrate W and the support substrate S with the bonding agent G. However, the superposed substrate to be peeled off by the peeling device is not limited to the aforementioned superposed substrate T. For example, in the peeling device 141, a superposed substrate obtained by bonding a donor substrate having an insulation film formed thereon and a target substrate may be used as a target of the peeling process in order to produce an SOI substrate.

Figure 24:
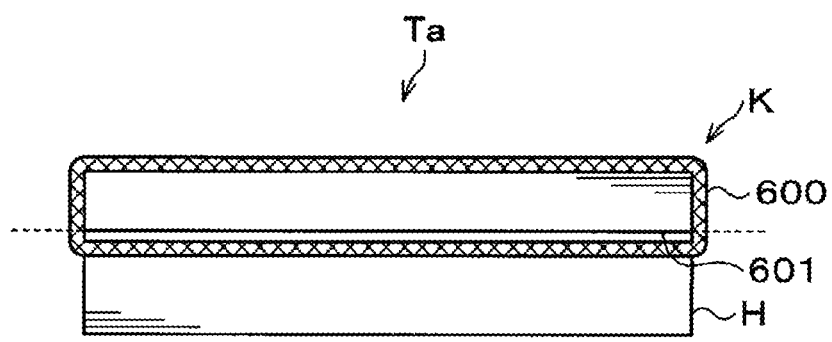
FIGS. 24 and 25 are schematic views illustrating a manufacturing process of an SOI substrate.
Figure 25:
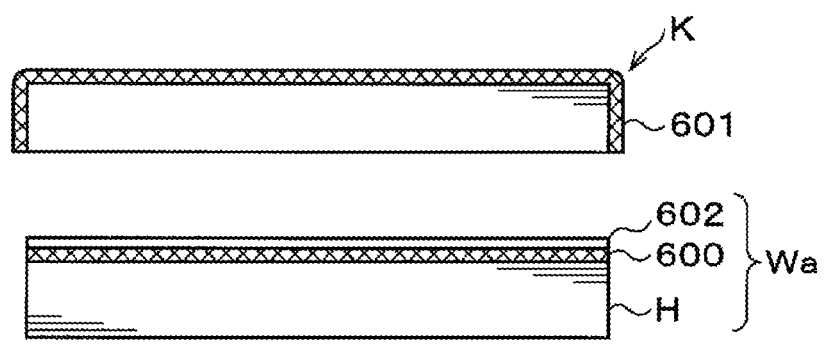
Figure 26:
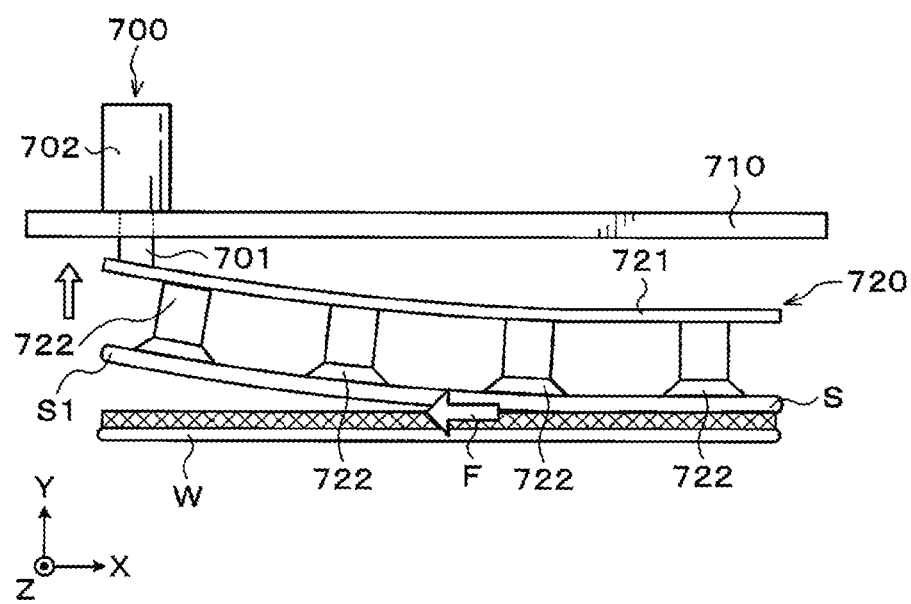
FIG. 26 is an explanatory view illustrating a peeling process of the related art.
Figure 27:
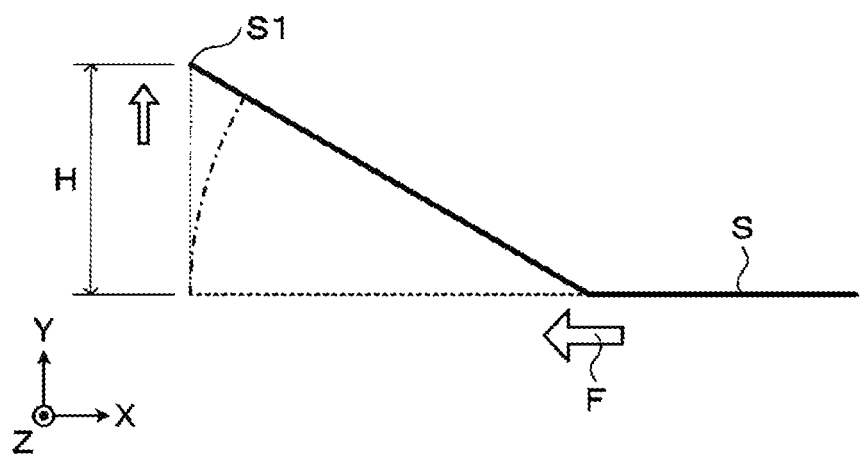
FIG. 27 is an explanatory view schematically illustrating the movement of a support substrate in the peeling process of the related art.

A method of manufacturing an SOI substrate will now be described with reference to FIGS. 24 and 25. FIGS. 24 and 25 are schematic views illustrating a manufacturing process of an SOI substrate. As illustrated in FIG. 24, a superposed substrate Ta for use in forming the SOI substrate is formed by bonding a donor substrate K and a handle substrate H.

The donor substrate K includes an insulation film 600 formed on a surface of the donor substrate K and a hydrogen ion-implanted layer 601 formed at a predetermined depth near a surface to be bonded to the handle substrate H. Examples of the handle substrate H may include a silicon wafer, a glass substrate, a sapphire substrate or the like.

In the peeling device 141, a mechanical impact is applied to the hydrogen ion-implanted layer 601 formed on the donor substrate K by, for example, pulling a portion of the outer periphery of the superposed substrate Ta in a state in which the donor substrate K is held by the second holding unit 420 while the handle substrate H is held by the first holding unit 310. Thus, as illustrated in FIG. 25, a silicon-silicon bond in the hydrogen ion-implanted layer 601 is disconnected so that a silicon layer 602 is peeled off from the donor substrate K. As a result, the insulation film 600 and the silicon layer 602 are transferred to an upper surface of the handle substrate H, thereby forming an SOI substrate Wa. Alternatively, the handle substrate H may be held by the second holding unit 420 and the donor substrate K may be held by the first holding unit 310.

In the aforementioned embodiments, there has been described an example where the target substrate W and the support substrate S are bonded together by the bonding agent G. Each of the bonding surfaces Wj and Sj may be divided into a plurality of regions. Bonding agents having different bonding forces may be applied to the respective regions.

In the aforementioned embodiments, there has been described an example where the superposed substrate T is held by the dicing frame F. However, the superposed substrate T need not be necessarily held by the dicing frame F.

According to the present disclosure, it is possible to properly perform the peeling process of the target substrate and the support substrate.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A peeling device which peels a superposed substrate obtained by bonding a first substrate and a second substrate together, from one end portion of the superposed substrate toward the other end portion thereof, comprising:
    a first holding unit configured to hold the first substrate of the superposed substrate;
    a second holding unit configured to hold the second substrate of the superposed substrate; and
    a moving unit configured to move the first holding unit away from the second holding unit,
    wherein the moving unit is configured to move in at least a peeling direction of the superposed substrate, and
    wherein the first holding unit includes a plate-shaped elastic member connected to the moving unit and a plurality of sucking parts installed in the elastic member so as to suck the first substrate.

2. The device of claim 1, wherein the moving unit includes a plurality of moving units arranged side by side in the peeling direction.

3. The device of claim 1, wherein the moving unit includes a plurality of moving units arranged side by side in a direction orthogonal to the peeling direction.

4. The device of claim 1, wherein the moving unit is configured to move in a direction extending along a peripheral edge of the superposed substrate.

5. The device of claim 1, wherein the moving unit is configured to move the first holding unit such that, when seen in a side view, a direction of a force acting on the first holding unit is orthogonal to an extension direction of the first holding unit.

6. The device of claim 5, wherein the moving unit includes a ball bearing installed in the first holding unit.

7. The device of claim 1, further comprising:
    a peeling inducing unit configured to form a peeling initiating part, which triggers peeling off the first substrate from the second substrate, on a side surface of one end portion of the superposed substrate, wherein the peeling inducing unit includes a disc-shaped sharp member and a rotating unit configured to rotate the sharp member about a vertical axis.

8. A peeling system provided with the peeling device of claim 1, comprising:
 a first processing block configured to perform processing with respect to the superposed substrate and the second substrate; and
 a second processing block configured to perform processing with respect to the first substrate,
 wherein the first processing block includes a loading/unloading station in which the superposed substrate and the second substrate are mounted, a peeling-off station provided with the peeling device and a first transfer region provided with a first transfer device which transfers the superposed substrate and the second substrate between the loading/unloading station and the peeling-off station, and
 the second processing block includes an unloading station in which the first substrate is mounted and a second transfer region provided with a second transfer device which transfers the first substrate with respect to the unloading station.

9. A peeling method of peeling a superposed substrate obtained by bonding a first substrate and a second substrate together, from one end portion of the superposed substrate toward the other end portion thereof, comprising:
 a first holding process in which the first substrate of the superposed substrate is held by a first holding unit;
 a second holding process in which the second substrate of the superposed substrate is held by a second holding unit; and
 a moving process in which the first holding unit is moved away from the second holding unit by a moving unit connected to the first holding unit,
 wherein, in the moving process, the moving unit is moved in at least a peeling direction of the superposed substrate, and wherein the first holding unit includes a plate-shaped elastic member connected to the moving unit and a plurality of sucking parts installed in the elastic member so as to suck the first substrate, and in the moving process, the moving unit moves the first holding unit while deforming the elastic member in a state in which the first substrate is sucked by the sucking parts.

10. The method of claim 9, wherein the moving unit includes a plurality of moving units arranged side by side in the peeling direction.

11. The method of claim 9, wherein the moving unit includes a plurality of moving units arranged side by side in a direction orthogonal to the peeling direction.

12. The method of claim 9, wherein, in the moving process, the moving unit moves in a direction extending along a peripheral edge of the superposed substrate.

13. The method of claim 9, wherein, in the moving process, the moving unit moves the first holding unit such that, when seen in a side view, a direction of a force acting on the first holding unit is orthogonal to an extension direction of the first holding unit.

14. The method of claim 9, further comprising:
 a peeling initiating part forming process in which, after the first holding process and the second holding process and before the moving step, a peeling initiating part which triggers peeling off the first substrate from the second substrate is formed on a side surface of one end portion of the superposed substrate by a peeling inducing unit,
 wherein the peeling inducing unit includes a disc-shaped sharp member and a rotating unit configured to rotate the sharp member about a vertical axis, and
 in the peeling initiating part forming process, the peeling initiating part is formed by bringing the sharp member being rotated by the rotating unit into contact with the side surface of one end portion of the superposed substrate.

* * * * *